US011242865B2

(12) United States Patent
Miyazaki et al.

(10) Patent No.: US 11,242,865 B2
(45) Date of Patent: Feb. 8, 2022

(54) FLUID APPARATUS

(71) Applicant: HITACHI, LTD., Tokyo (JP)

(72) Inventors: Mariko Miyazaki, Tokyo (JP); Akihiro Miyauchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 188 days.

(21) Appl. No.: 16/476,887

(22) PCT Filed: Nov. 30, 2017

(86) PCT No.: PCT/JP2017/043129
§ 371 (c)(1),
(2) Date: Jul. 10, 2019

(87) PCT Pub. No.: WO2018/139049
PCT Pub. Date: Aug. 2, 2018

(65) Prior Publication Data

US 2020/0263704 A1 Aug. 20, 2020

(30) Foreign Application Priority Data

Jan. 24, 2017 (JP) ............................ JP2017-010139

(51) Int. Cl.
*F04D 29/44* (2006.01)
*F04D 29/28* (2006.01)
(Continued)

(52) U.S. Cl.
CPC ......... *F04D 29/444* (2013.01); *F04D 29/284* (2013.01); *F04D 29/30* (2013.01);
(Continued)

(58) Field of Classification Search
CPC ...... F04D 29/444; F04D 29/284; F04D 29/30; F04D 29/666; F04D 29/681; F05D 2250/60; F05D 2250/52; F15D 1/12
See application file for complete search history.

(56) References Cited

U.S. PATENT DOCUMENTS 3,523,661 A 8/1970 Rethorst
4,655,419 A * 4/1987 van der Hoeven ..... B64C 23/06
244/200.1

(Continued)

FOREIGN PATENT DOCUMENTS

EP 2087827 A1 8/2009
JP 46-7933 3/1971

(Continued)

OTHER PUBLICATIONS

Shiki Okamoto, et al., "Drag Reduction in Pipe Flow with Riblet" Transactions of the JSME (in Japanese) (B), Apr. 25, 2002, vol. 68, No. 668, pp. 1058-1064.

(Continued)

*Primary Examiner* — Justin D Seabe
*Assistant Examiner* — Eric A Lange
(74) *Attorney, Agent, or Firm* — Mattingly & Malur, PC

(57) ABSTRACT

Structures are formed in a shape protruding from a wing surface, and a plurality of riblets are formed in a shape depressed from the wing surface. A first cross section obtained by cutting the structure by a flat face that is parallel to a flow and perpendicularly intersects with the wing surface has an inclined side that extends from a point on the wing surface to a top that is a point apart from the wing surface. An inter-structure flow channel is formed between two adjacent structures among the plurality of structures. The area of a face in one of the two structures and the area of a face in the other structure with which a fluid flowing in the inter-structure flow channel comes into contact are different from each other. Accordingly, peeling of the flow can be suppressed and the frictional resistance of the flow can be decreased.

15 Claims, 18 Drawing Sheets

(51) Int. Cl.

| | |
|---|---|
| ***F04D 29/30*** | (2006.01) |
| ***F04D 29/66*** | (2006.01) |
| ***F15D 1/12*** | (2006.01) |

(52) U.S. Cl.

CPC ........ *F04D 29/666* (2013.01); *F05D 2250/60* (2013.01); *F15D 1/12* (2013.01)

(56) References Cited

U.S. PATENT DOCUMENTS

| | | | | |
|---|---|---|---|---|
| 5,361,828 | A * | 11/1994 | Lee | F01D 5/187 165/109.1 |
| 5,846,055 | A | 12/1998 | Brodersen et al. | |
| 8,596,958 | B2 * | 12/2013 | Teraoka | F24F 7/007 415/53.1 |
| 2004/0194751 | A1 | 10/2004 | Limbrunner et al. | |
| 2014/0328692 | A1 * | 11/2014 | Riddell | F03D 1/0633 416/236 R |
| 2014/0328693 | A1 * | 11/2014 | Wilson | F03D 1/0633 416/236 R |
| 2015/0292476 | A1 * | 10/2015 | Obrecht | F03D 1/0633 416/228 |
| 2016/0186660 | A1 | 6/2016 | Bergholz et al. | |

FOREIGN PATENT DOCUMENTS

| | | | | |
|---|---|---|---|---|
| JP | 9-264296 | | 10/1997 | |
| JP | 2004524502 | | 8/2004 | |
| JP | 2005163640 | A | 6/2005 | |
| JP | 2005525497 | A | 8/2005 | |
| JP | 2008008248 | A * | 1/2008 | F03D 11/00 |
| JP | 2008008248 | A | 1/2008 | |
| WO | 2002084197 | | 10/2002 | |

OTHER PUBLICATIONS

International Search Report of PCT/JP2017/043129 dated Feb. 20, 2018.

Japanese Office Action received in corresponding Japanese Application No. 2018-564135 dated Sep. 1, 2020.

* cited by examiner

BASE LENGTH RATIO (W2/W1)

BASE LENGTH RATIO (W2/W1)

FLUID APPARATUS

TECHNICAL FIELD

The present invention relates to a fluid apparatus including wings such as a centrifugal compressor, a vacuum cleaner, or an air conditioner.

BACKGROUND ART

In a fluid apparatus such as a centrifugal compressor, a vacuum cleaner, or an air conditioner, a flow channel is formed among a plurality of wings, and the cross-sectional area of the flow channel is changed. A flow velocity is changed by changing the cross-sectional area of the flow channel. According to Bernouilli's theorem, when pressure is increased, a flow velocity is decreased. In addition, the flow velocity of a fluid in a boundary layer is decreased due to viscosity, and thus the kinetic energy becomes small. Therefore, around surfaces of the wings where the fluid flows in the fluid apparatus, the fluid cannot flow along the surfaces of the wings to possibly cause peeling of the flow.

Such peeling of the flow in the fluid apparatus disadvantageously causes a decrease in surge margin of the fluid apparatus and a noise.

In addition, the frictional resistance of the flow on the surfaces of the wings occurs to disadvantageously cause a loss in energy of the fluid apparatus.

As techniques related to the technical field, there are techniques described in, for example, Patent Literatures 1 to 5.

Patent Literature 1 discloses a technique in which fins are provided on an inner face of a heat transfer tube used for a heat exchanger and other components to improve heat transfer performance.

Patent Literature 2 discloses that an uneven surface configuring irregularities is provided on a surface of a flap arranged on a wall surface of a suction tube or inside the suction tube, and the suction tube for an intake system of an internal combustion engine accordingly avoids peeling of a flow and formation of a vortex flow.

Patent Literature 3 discloses an impeller that prevents expansion of a boundary layer or peeling of a flow to realize high efficiency of a compressor by forming a plurality of grooves on a surface of a hub.

Patent Literature 4 discloses a technique in which riblets are provided on blade wings of a vertical shaft wind mill to improve rotation characteristics and to suppress a noise attended with the rotation.

Patent Literature 5 discloses a technique in which riblets whose heights are gradually increased towards the exit of an impeller are provided on a side wall face of an impeller inner flow channel of a centrifugal compressor to suppress a loss in velocity and energy and a decrease in efficiency of the impeller.

CITATION LIST

Patent Literature

Patent Literature 1: Japanese Translation of PCT International Application Publication No. 2004-524502
Patent Literature 2: Japanese Translation of PCT International Application Publication No. 2005-525497
Patent Literature 3: Japanese Unexamined Patent Application Publication No. 2005-163640
Patent Literature 4: Japanese Unexamined Patent Application Publication No. 2008-008248
Patent Literature 5: Japanese Unexamined Patent Application Publication No. H9-264296

Nonpatent Literature

Nonpatent Literature 1: "Drag Reduction in Pipe Flow with Riblet" by Shiki OKAMOTO and two others, Transactions of the JSME (in Japanese) (B), Apr. 25, 2002, Vol. 68, No. 668, pp. 1058-1064

SUMMARY OF INVENTION

Technical Problem

In order to prevent peeling of a flow in a fluid apparatus, it is considered effective that a momentum exchange is allowed to be generated between a boundary layer and a mainstream, and a strong flow of the mainstream is applied to a weak flow in a boundary layer to increase kinetic energy in the boundary layer. In addition, in order to prevent the peeling of the flow by increasing the kinetic energy in the boundary layer, it is considered effective that a small vortex is allowed to be generated in the boundary layer, and the vortex is further carried to the mainstream direction to generate the momentum exchange between the boundary layer and the mainstream.

In the technique described in Patent Literature 1, the fins in two directions that intersect with each other are provided on the inner face of the heat transfer tube used for the heat exchanger and other components. Therefore, there is a possibility that a small vortex is generated in a groove formed by the fins. However, there is no mechanism to carry the small vortex formed in the groove to the mainstream direction, and the vortex stays in the groove.

In the technique described in Patent Literature 2, the irregularities are formed on the surface of the flap. In addition, the irregularities (shark scales) described in FIG. 5 of Patent Literature 2 are inclined with respect to the flow direction, but an effect obtained by carrying a generated small vortex to the mainstream is unknown. In addition, the cross-sectional shape of the irregularities perpendicular to the flow is not described. Therefore, it is unknown whether or not the small vortex is to be generated in the boundary layer.

As described above, a mechanism of generating the vortex in the boundary layer to be carried to the mainstream direction is not provided in both of the techniques described in Patent Literatures 1 and 2. Thus, the momentum exchange hardly occurs between the boundary layer and the mainstream. Accordingly, the kinetic energy in the boundary layer cannot be increased, and the peeling of the flow cannot be sufficiently suppressed. In addition, if irregularities are provided on a surface of a flow channel in the techniques described in Patent Literatures 1 and 2, there is a possibility that the frictional resistance of the flow is increased due to the irregularities.

Irregular structures forming grooves are provided only in the direction along the flow in all the techniques of Patent Literatures 3 to 5. Hereinafter, such structures are referred to as riblets. For example, Nonpatent Literature 1 describes that the frictional resistance of a flow is decreased by providing the riblets. Accordingly, there is a possibility that the frictional resistance of the flow is decreased according to the techniques of Patent Literatures 3 to 5. However, the riblets are not provided with a mechanism of carrying the small vortex formed in the groove to the mainstream direction, and the vortex stays in the riblets. Thus, an effect of suppressing the peeling of the flow cannot be expected.

As described above, the techniques of Patent Literatures 1 to 5 cannot realize both of a suppression in peeling of the flow and a decrease in frictional resistance of the flow.

The present invention has been achieved in view of the above-described circumstances, and an object thereof is to decrease the frictional resistance of a flow while suppressing peeling of the flow in a fluid apparatus.

Solution to Problem

In order to achieve the above-described object, a fluid apparatus according to the present invention comprising: a plurality of wings between which a fluid flows; a plurality of structures that is provided on a wing surface that is a surface of each wing and is formed in a shape protruding from the wing surface, and a plurality of riblets that is provided on the wing surface and is formed in a shape depressed from the wing surface, is characterized in that, a first cross section obtained by cutting the structure while passing through a top of the structure by a flat face that is parallel to the flow of the fluid and perpendicularly intersects with the wing surface has a side that extends from a point on the wing surface to a point apart from the wing surface on the downstream side of the flow of the fluid, an inter-structure flow channel is formed between two adjacent structures among the plurality of structures, and the area of a part in one of the two structures and the area of a part in the other with which the fluid flowing in the inter-structure flow channel comes into contact are different from each other.

Advantageous Effects of Invention

According to the present invention, it is possible to decrease the frictional resistance of a flow while suppressing peeling of the flow in a fluid apparatus.

DESCRIPTION OF EMBODIMENTS

Figure 1:
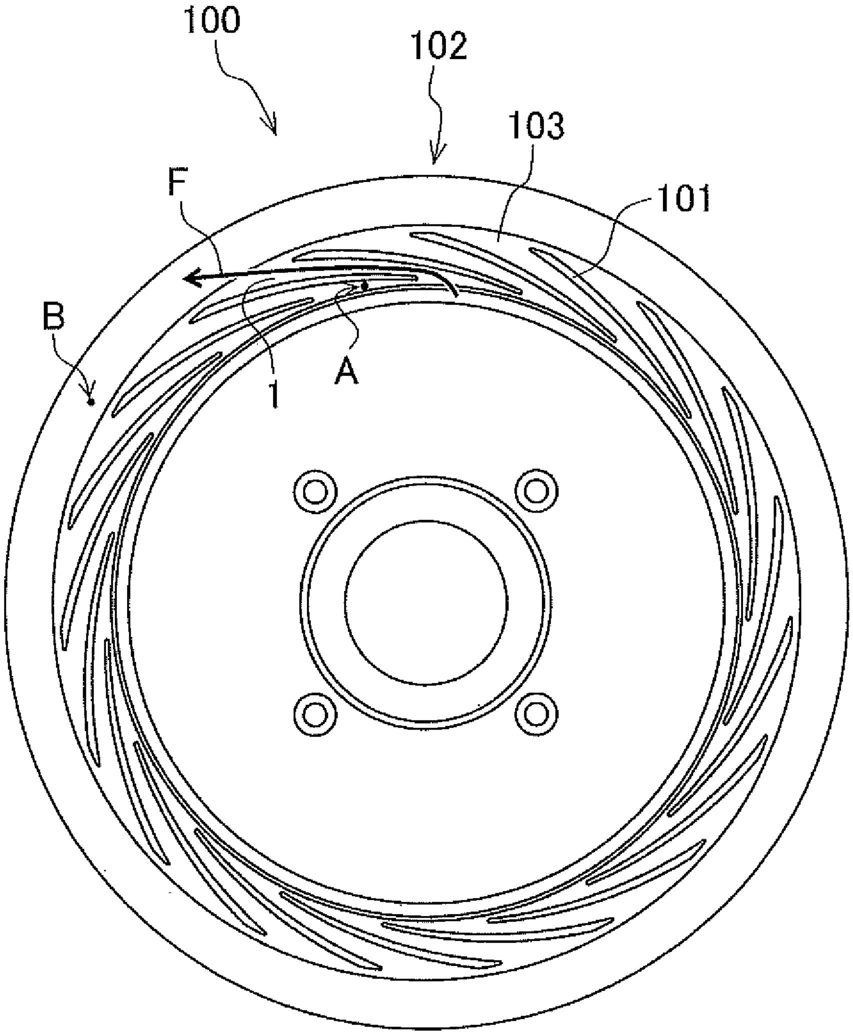
FIG. 1 is a diagram of a diffuser used for a fluid apparatus according to a first embodiment of the present invention when viewed from the central axis direction.

Embodiments of the present invention will be described in detail while appropriately referring to the drawings. It should be noted that common constitutional elements and similar constitutional elements will be followed by the same signs in each drawing, and duplicated explanation thereof will be appropriately omitted.

First Embodiment

First, a first embodiment of the present invention will be described while referring to FIG. 1 to FIG. 5.

Figure 2:
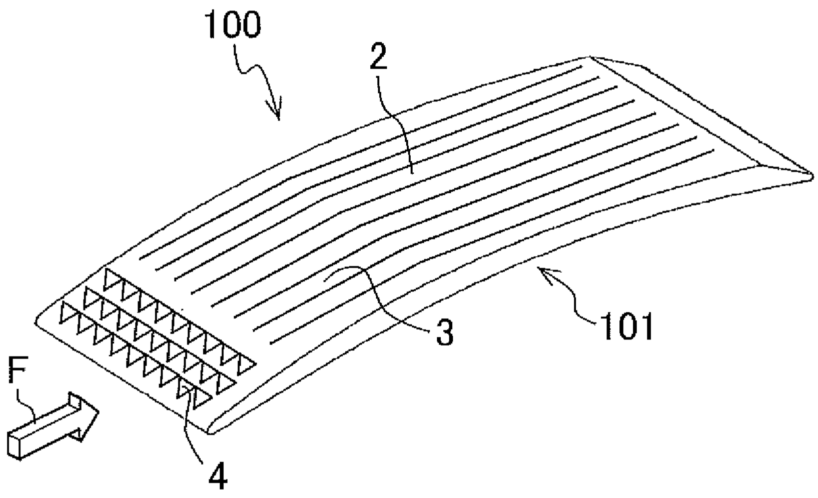
FIG. 2 is a perspective view for schematically showing a wing of the diffuser shown in FIG. 1.

FIG. 1 is a diagram of a diffuser 102 used for a fluid apparatus 100 according to the first embodiment of the present invention when viewed from the central axis direction. FIG. 2 is a perspective view for schematically showing a wing 101 of the diffuser 102 shown in FIG. 1. Here, a centrifugal compressor will be described as an example of the fluid apparatus 100.

As shown in FIG. 1, the diffuser 102 has a ring-shaped hub plate 103 and wings 101 erecting on a surface of the hub plate 103. By providing the plurality of wings 101 used for the diffuser 102, flow channels 1 are formed among the plurality of wings 101, and a liquid or gas flow F is generated. Namely, a fluid flows among the plurality of wings 101.

As shown in FIG. 2, the fluid apparatus 100 includes a plurality of structures 4 provided on a wing surface 2 that is a surface of the wing 101 and a plurality of riblets 3 provided on the wing surface 2. The structures 4 are formed so as to protrude from the wing surface 2. On the other hand, the riblets 3 are formed to be depressed from the wing surface 2. The riblets 3 form grooves in the direction along the flow F.

As shown in FIG. 1 to FIG. 2, the structures 4 and the riblets 3 are formed on the wing surface 2 forming a flow channel 1 with a risk that a flow channel cross-sectional area changes in the liquid or gas flow F to cause peeling of the flow F in the present embodiment. The flow channel 1 is formed in such a manner that the flow channel cross-sectional area expands from the upstream to the downstream of the flow F, and is configured as the diffuser 102 of the fluid apparatus 100 that is a centrifugal compressor in this case. The diffuser 102 is arranged on the downstream side of an impeller (not shown), and converts the dynamic pressure of a fluid flowing in from the exit of the impeller to the static pressure. However, the flow channel 1 is not limited to the diffuser 102, but may be another flow channel whose flow channel cross-sectional area changes.

The wing surface 2 is a general term of a negative pressure face that is a face on the back side with respect to the rotational direction of the impeller (not shown) and a pressure face that is a face on the opposite side. Thus, the riblets 3 and the structures 4 are provided on both of the negative pressure face and the pressure face of the wing 101 in this case, but may be provided on one of the faces. It is preferable that the structures 4 are provided at a region (for example, an upstream-side end region of the wing surface 2) where the peeling of the flow F recognized by experiment or fluid analysis is likely to occur, and the riblets 3 are provided at the entirety or a part of the other regions. In addition, the structures 4 are provided at a region corresponding to, for example, 2 to 20% of the wing surface 2, but the present invention is not limited thereto.

The fluid flowing in the flow channel 1 is, for example, air, and the flow velocity thereof is, for example, 100 m/s. However, the present invention is not limited thereto. In addition, the material of the wings 101 and the structures 4 is, for example, aluminum material. However, the present invention is not limited thereto. The material thereof may be metal material other than aluminum material, organic material, or inorganic material.

Figure 3:
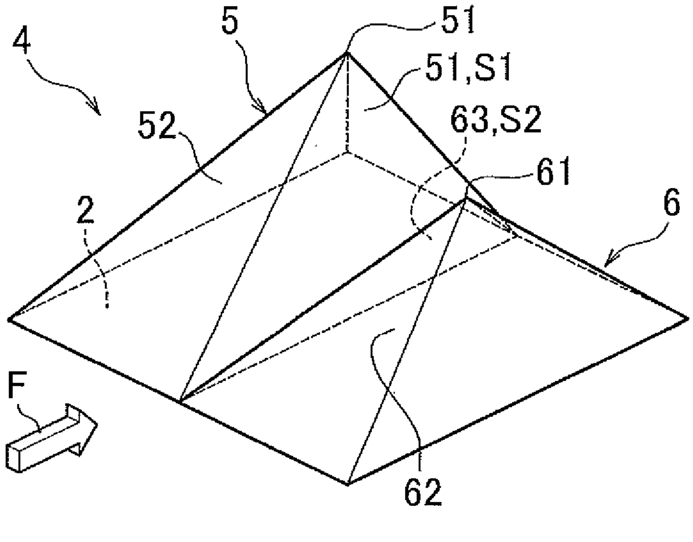
FIG. 3 is a perspective view for showing a structure provided on a wing surface in the fluid apparatus according to the first embodiment.

FIG. 3 is a perspective view for showing the structure 4 provided on the wing surface 2 in the fluid apparatus 100 according to the first embodiment. As shown in FIG. 3, the plurality of structures 4 includes structures 5 and 6 having at least two kinds of shapes, such as the pyramidal shapes that are shown.

Figure 4A:
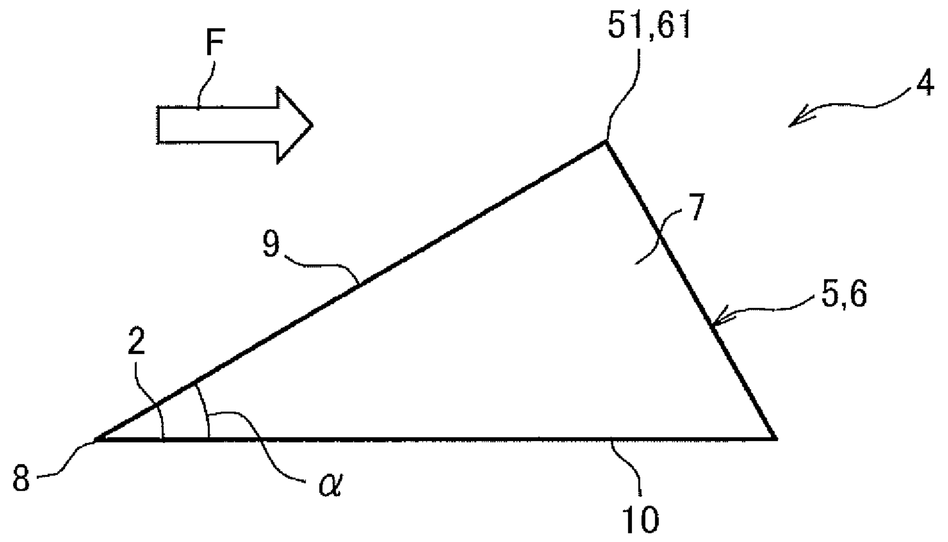
FIG. 4(*a*) is a diagram for showing a first cross section obtained by cutting the structure while passing through tops that are apexes of the structure by a flat face that is parallel to a flow of a fluid and perpendicularly intersects with the wing surface, and FIG. 4(*b*) is a diagram for showing a second cross section obtained by cutting the structure while passing through the tops of the structure by a flat face perpendicular to the flow of the fluid.
Figure 4B:
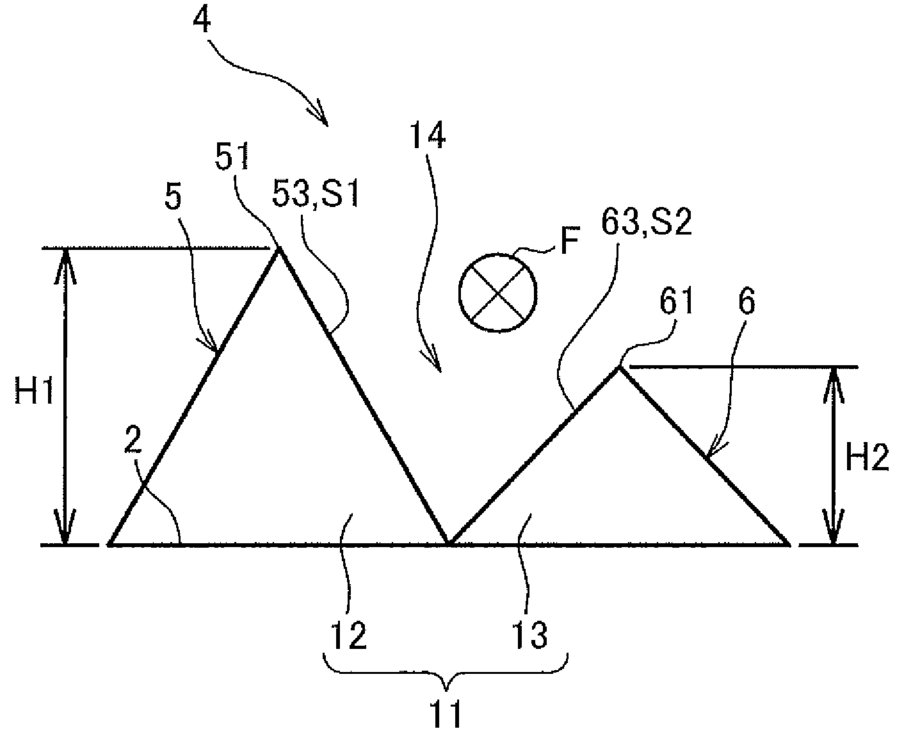

FIG. 4(*a*) is a diagram for showing a first cross section 7 obtained by cutting the structure 4 while passing through tops 51 and 61 that are apexes of the structure 4 by a flat face that is parallel to the flow F of the fluid and perpendicularly intersects with the wing surface 2.

Figure 6A:
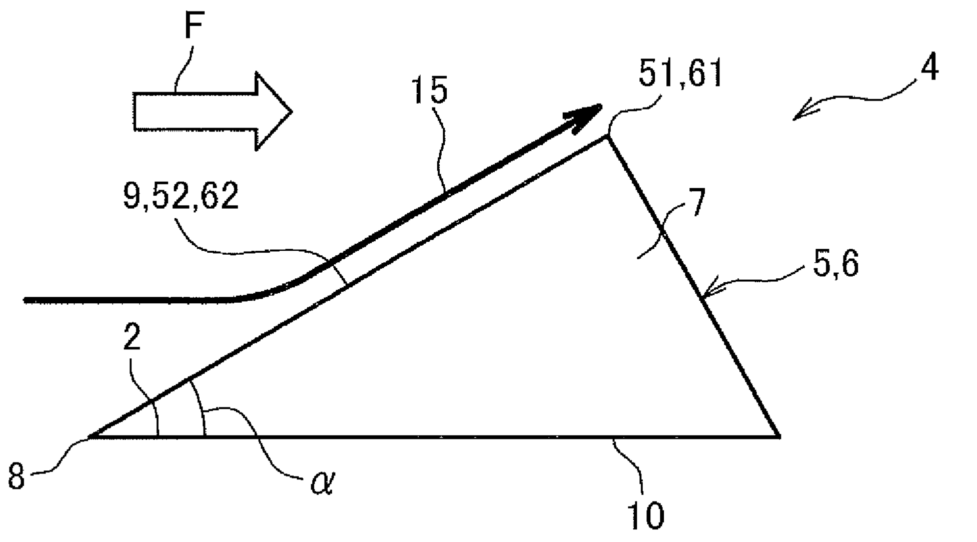
FIG. 6(*a*) is a diagram for explaining generation of an upward flow, and FIG. 6(*b*) is a diagram for explaining generation of a vortex.
Figure 6B:
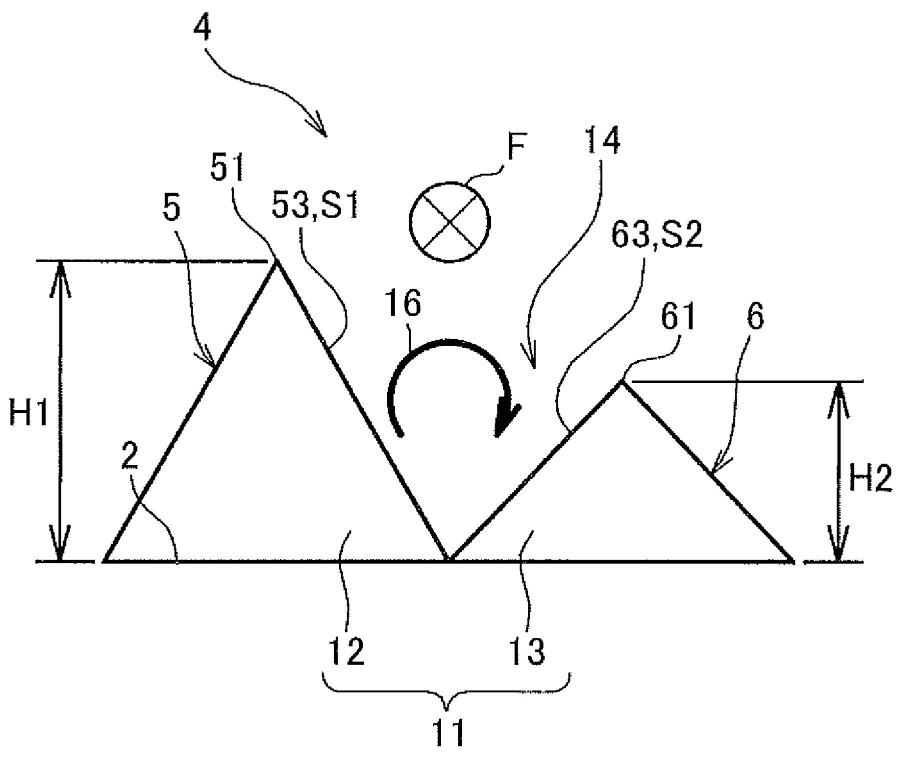
Figure 8A:
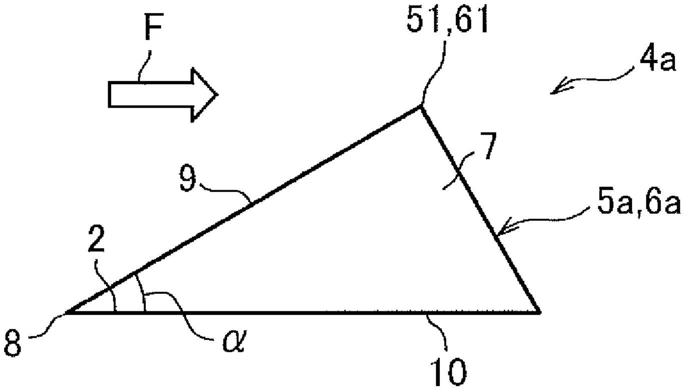
FIG. 8(*a*) is a diagram for showing a first cross section obtained by cutting the structure while passing through tops that are apexes of the structure by a flat face that is parallel to a flow of a fluid and perpendicularly intersects with the wing surface, and FIG. 8(*b*) is a diagram for showing a second cross section obtained by cutting the structure while passing through the tops of the structure by a flat face perpendicular to the flow of the fluid.
Figure 8B:
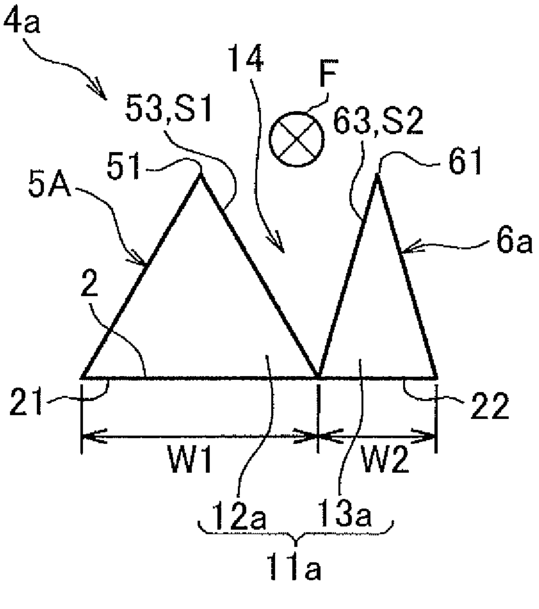
Figure 10A:
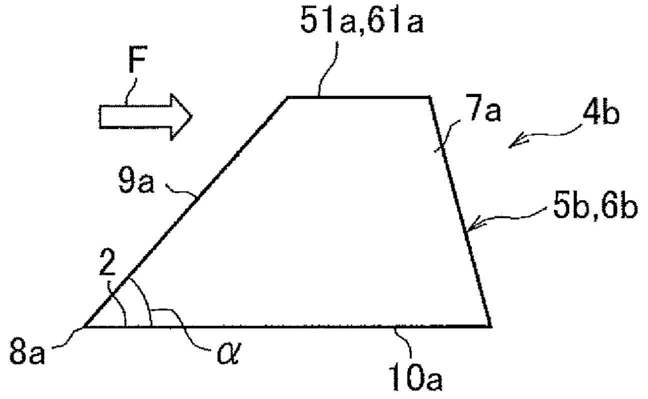
FIG. 10(*a*) is a diagram for showing a first cross section obtained by cutting the structure while passing through tops that are upper bottom faces of the structure by a flat face that is parallel to a flow of a fluid and perpendicularly intersects with the wing surface, and FIG. 10(*b*) is a diagram for showing a second cross section obtained by cutting the structure while passing through the tops of the structure by a flat face perpendicular to the flow of the fluid.
Figure 10B:
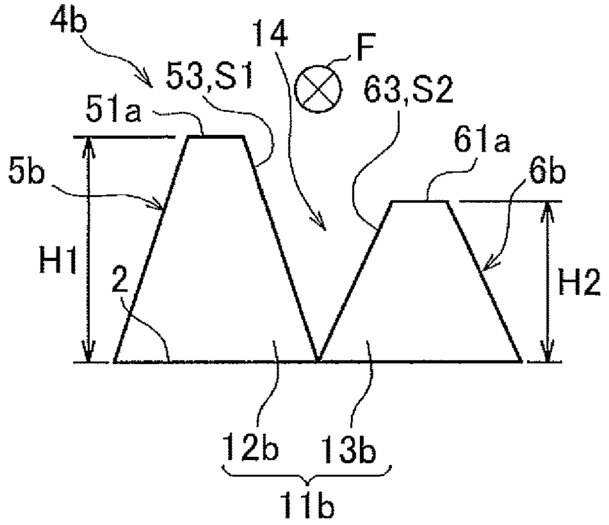
Figure 12A:
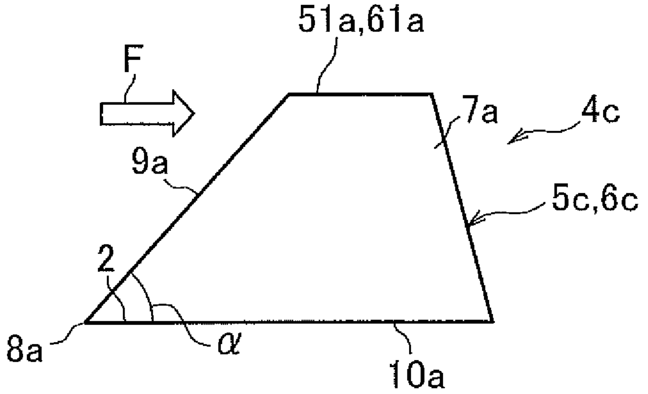
FIG. 12(*a*) is a diagram for showing a first cross section obtained by cutting the structure while passing through tops that are upper bottom faces of the structure by a flat face that is parallel to a flow of a fluid and perpendicularly intersects with the wing surface, and FIG. 12(*b*) is a diagram for showing a second cross section obtained by cutting the structure while passing through the tops of the structure by a flat face perpendicular to the flow of the fluid.
Figure 12B:
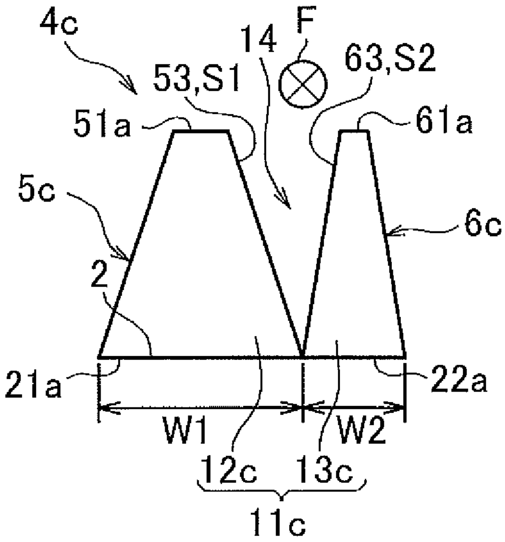
Figure 14A:
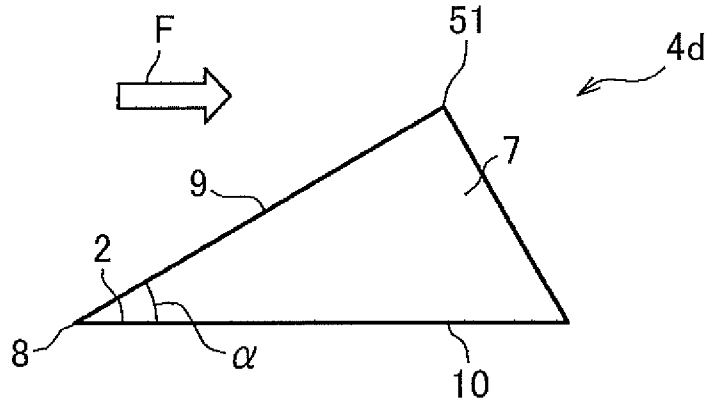
FIG. 14(*a*) is a diagram for showing a first cross section obtained by cutting the structure while passing through a top that is an apex of the structure by a flat face that is parallel to a flow of a fluid and perpendicularly intersects with the wing surface, and FIG. 14(*b*) is a diagram for showing a second cross section obtained by cutting the structure while passing through the top of the structure by a flat face perpendicular to the flow of the fluid.
Figure 14B:
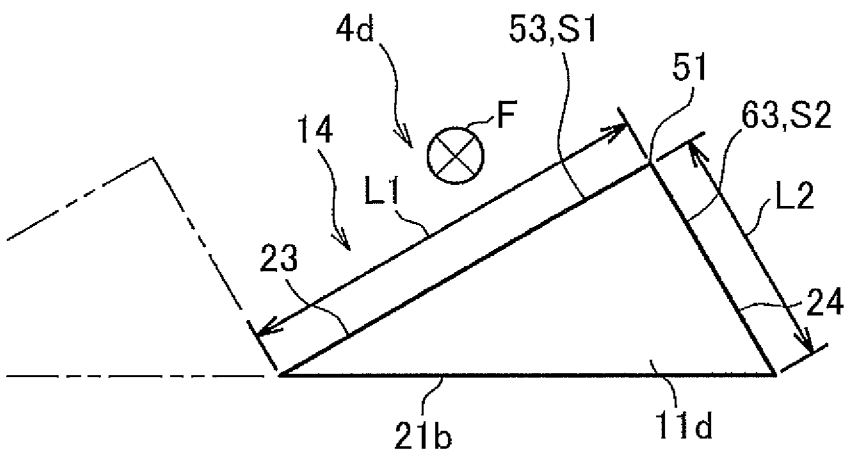
Figure 16A:
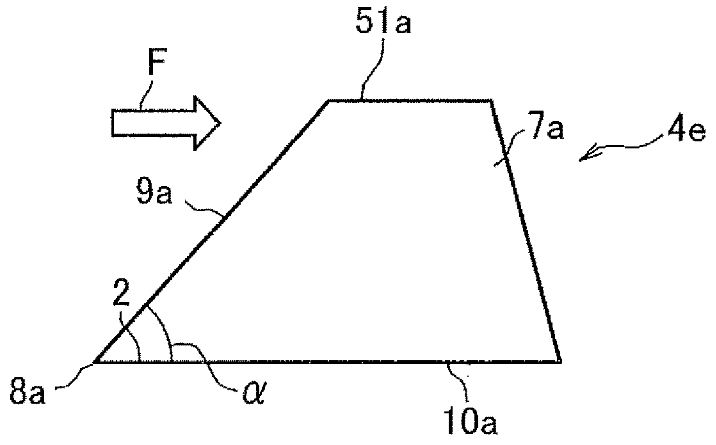
FIG. 16(*a*) is a diagram for showing a first cross section obtained by cutting the structure while passing through a top that is an upper bottom face of the structure by a flat face that is parallel to a flow of a fluid and perpendicularly intersects with the wing surface, and FIG. 16(*b*) is a diagram for showing a second cross section obtained by cutting the structure while passing through the top of the structure by a flat face perpendicular to the flow of the fluid.
Figure 16B:
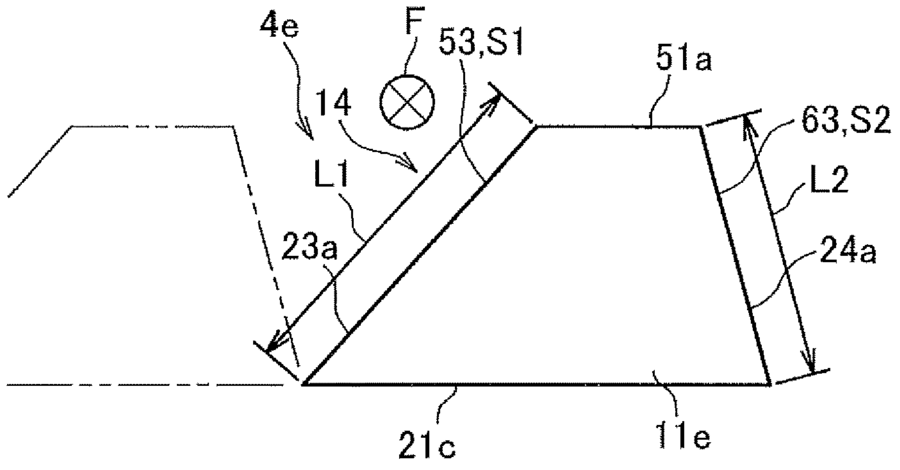
Figure 20A:
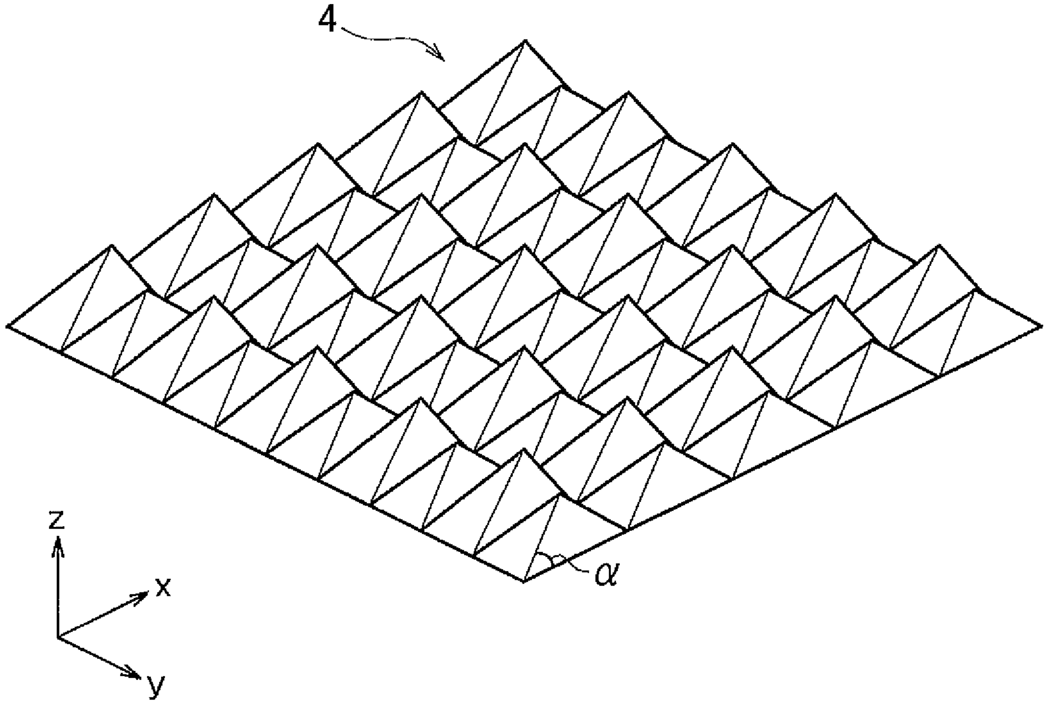
FIG. 20(*a*) is an enlarged perspective view for showing a first structure model to analyze a generation effect of a vortex, and FIG. 20(*b*) is a diagram for showing a cross section obtained by cutting the structure model while passing through a top of the structure model by a flat face perpendicular to a flow.
Figure 20B:
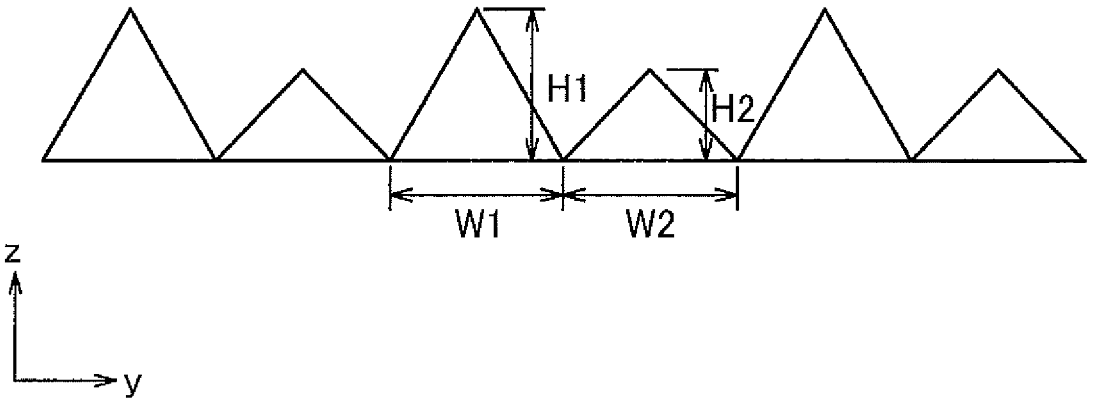
Figure 22A:
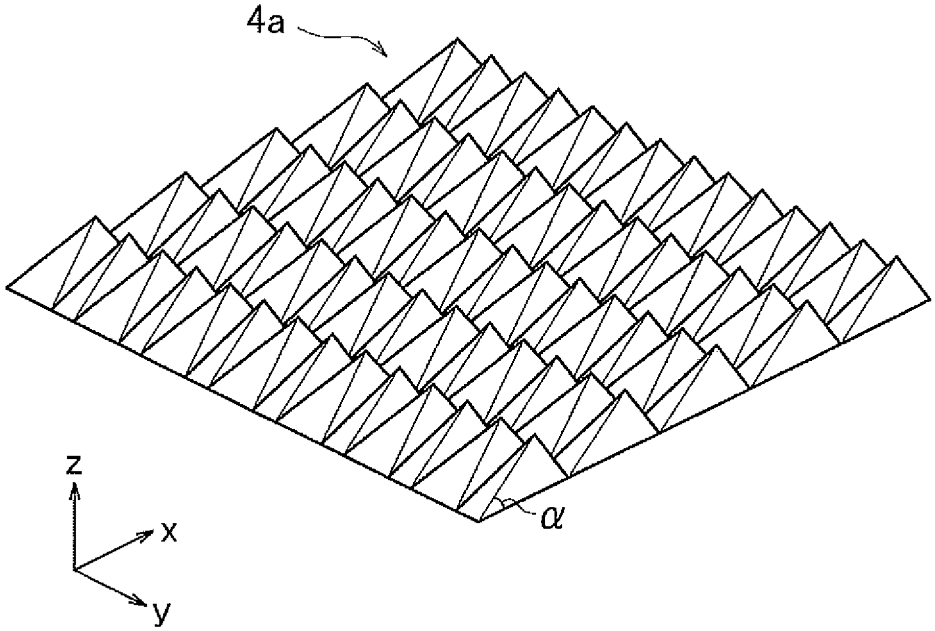
FIG. 22(*a*) is an enlarged perspective view for showing a second structure model to analyze the generation effect of the vortex, and FIG. 22(*b*) is a diagram for showing a cross section obtained by cutting the structure model while passing through the top of the structure model by a flat face perpendicular to the flow.
Figure 22B:
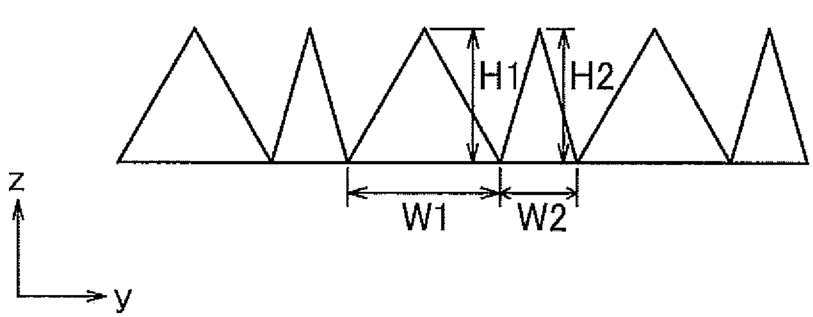

It should be noted that hatching of the cross section is omitted in FIG. 4(*a*) (the same applies to FIG. 4(*b*), FIGS. 6(*a*) and 6(*b*), FIGS. 8(*a*) and 8(*b*), FIGS. 10(*a*) and 10(*b*), FIGS. 12(*a*) and 12(*b*), FIGS. 14(*a*) and 14(*b*), FIGS. 16(*a*) and 16(*b*), FIG. 20(*b*), and FIG. 22(*b*)).

As shown in FIG. 4(*a*), the first cross section 7 includes a triangle having a side 9 that extends from a point 8 on the wing surface 2 to the tops 51 and 61 apart from the wing surface 2 on the downstream side of the flow F of the fluid, and a base 10 positioned on the wing surface 2. The side 9 and the base 10 share the point 8 on the upstream side of the flow F. An angle $\alpha$ formed by the base 10 and the side 9 configures an inclined angle of the side 9 with respect to the wing surface 2.

FIG. 4(*b*) is a diagram for showing a second cross section 11 obtained by cutting the structure 4 while passing through the tops 51 and 61 of the structure 4 by a flat face perpendicular to the flow F of the fluid. As shown in FIG. 4(*b*), the second cross section 11 includes triangles 12 and 13 as at least two kinds of polygons that are different from each other.

An inter-structure flow channel 14 is formed between two structures 5 and 6 that are adjacent to each other in the plurality of structures 4. Further, the area S1 of a face 53 that is a part in the structure 5 as one of the two structures 5 and 6 with which the fluid flowing in the inter-structure flow channel 14 comes into contact is different from the area S2 of a face 63 that is a part in the structure 6 as the other of the two structures 5 and 6 with which the fluid flowing in the inter-structure flow channel 14 comes into contact.

The second cross section 11 shown in FIG. 4(*b*) includes the triangles 12 and 13 that are different from each other and have a height ratio (H2/H1) of 0.1 or larger and 0.6 or smaller, preferably, 0.1 or larger and 0.3 or smaller. It is possible to avoid a state in which the smaller structure 6 does not substantially exist by setting the ratio at the lower limit value or higher in the range. In addition, a difference between the area S1 of a part in one structure 5 and the area S2 of a part in the other structure 6 with which the fluid flowing in the inter-structure flow channel 14 comes into contact can become remarkable by setting the ratio at the upper limit value or lower in the range. Accordingly, a vortex is more likely to be generated in a boundary layer near the wing surface 2 as will be described later.

In addition, the inclined angle α of the side 9 with respect to the wing surface 2 in the first cross section 7 shown in FIG. 4(*a*) is 10 degrees or larger and 45 degrees or smaller, preferably, 20 degrees or larger and 30 degrees or smaller. It is possible to effectively generate an upward flow 15 (see FIG. 6) along inclined faces 52 and 62 (see FIG. 3) corresponding to the side 9 by setting the angle at the lower limit value or larger in the range. In addition, it is possible to suppress the flow F itself of the fluid from being blocked by the inclined faces 52 and 62 serving as a weir by setting the angle at the upper limit value or smaller in the range. Accordingly, the generated vortex can be more effectively carried in the mainstream direction as will be described later.

Figure 5A:
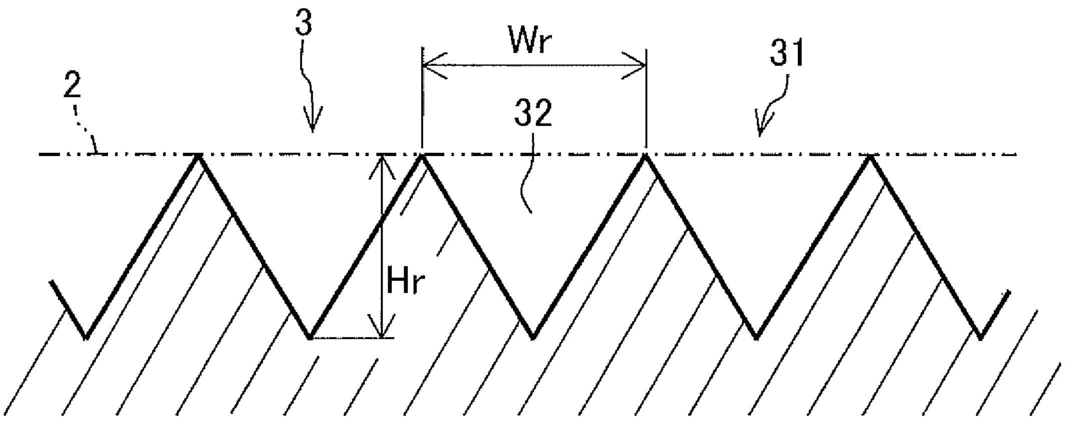
FIG. 5(*a*) is a diagram for showing an example of a third cross section obtained by cutting a riblet by a flat face perpendicular to the flow of the fluid, and FIG. 5(*b*) is a diagram for showing another example of a third cross section obtained by cutting a riblet by a flat face perpendicular to the flow of the fluid.
Figure 5B:
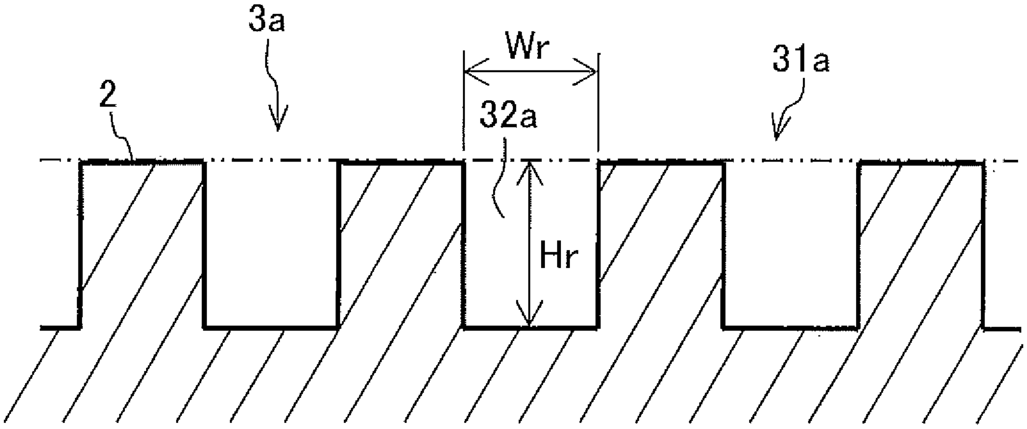

FIG. 5 are diagrams for showing third cross sections 31 and 31*a* obtained by cutting riblets 3 and 3*a* by a flat face perpendicular to the flow F of the fluid. FIG. 5(*a*) shows a shape of the third cross section 31 according to one example. The third cross section 31 includes a plurality of triangular groove cross sections 32 each having a width Wr and a height Hr. FIG. 5(*b*) shows a shape of the third cross section 31*a* according to another example. The third cross section 31*a* includes a plurality of quadrangular groove cross sections 32*a* each having a width Wr and a height Hr. According to the configurations of the groove cross sections 32 and 32*a*, the shapes of the riblets 3 and 3*a* can be more simplified.

The shapes of the third cross sections 31 and 31*a* obtained by cutting the riblets 3 and 3*a* by a flat face perpendicular to the flow F of the fluid are the same irrespective of the cut positions of the riblets 3 and 3*a* of the wing 101. In addition, the shapes of the third cross sections 31 and 31*a* are not limited to FIG. 5.

Hereinafter, a method of forming the structures 4 and the riblets 3 and 3*a* on the wing surface 2 will be described.

The structures 4 and the riblets 3 and 3*a* of the present embodiment can be formed by cutting work. In the cutting work, for example, an ultra-precision vertical machine can be used. As a tool, for example, a flat end mill made of cBN (cubic boron nitride) can be used. The rotational speed of the tool is set at, for example, 60000 rpm. The structure 4 shown in FIG. 3 to FIG. 4 and the riblets 3 and 3*a* shown in FIG. 5 can be obtained by conducting such cutting work in the direction parallel to the flow F and the direction perpendicular to the flow F. However, the method of forming the structures 4 and the riblets 3 and 3*a* is not limited to the above-described method.

Next, a mechanism that can suppress the peeling of the flow will be described using FIG. 6.

FIG. 6(*a*) is a diagram for explaining generation of an upward flow. FIG. 6(*b*) is a diagram for explaining generation of a vortex.

An upward flow 15 flowing from the wing surface 2 to the mainstream direction is generated because the inclined faces 52 and 62 with respect to the direction parallel to the flow F are present as shown in the first cross section that is parallel to the flow F of FIG. 6(*a*) and perpendicularly intersects with the wing surface 2.

In addition, when there is a difference between the heights H1 and H2 of the triangles 12 and 13 included in the second cross section 11 as shown in the second cross section 11 perpendicular to the flow F of FIG. 6(*b*), a difference occurs between the areas S1 and S2 of the faces 53 and 63 with which the fluid comes into contact on the left and right sides viewed from the upstream side of the flow F in the inter-structure flow channel 14. As a result, the inter-structure flow channel 14 becomes asymmetrical on the left and right sides viewed from the upstream side of the flow F, and thus the flow velocity differs between a point near the face 53 and a point near the face 63.

Here, when the density is p, Bernoulli's theorem is expressed by the following equation (1).

[Formula 1]

$$\frac{\rho}{2}U^2 + P = \text{constant} \tag{1}$$

According to the equation (1), when the velocity U of the fluid is decreased, the pressure P is increased. Thus, the asymmetry of the inter-structure flow channel 14 causes a pressure difference on the left and right sides viewed from the upstream side of the flow F, a flow field 16 rotated due to the pressure difference is generated, and the vortex can be easily generated.

As described above, the fluid apparatus 100 according to the present embodiment has the plurality of structures 4 formed so as to protrude from the wing surface 2. In addition, the first cross section 7 of the structure 4 obtained by being cut by a flat face that is parallel to the flow F and perpendicularly intersects with the wing surface 2 has the inclined side 9 that extends from the point 8 on the wing surface 2 to the tops 51 and 61 that are points apart from the wing surface 2 on the downstream side. Further, the inter-structure flow channel 14 is formed between the two structures 5 and 6 that are adjacent to each other in the plurality of structures 4. In addition, the area S1 of the face 53 in the structure 5 as one of the two structures 5 and 6 with which the fluid flowing in the inter-structure flow channel 14 comes into contact is different from the area S2 of the face 63 in the other structure 6.

As described above, the structures 4 according to the present embodiment have a mechanism that generates a vortex and a mechanism that carries the vortex to the mainstream. Thus, the vortex plays a role to generate a momentum exchange between a boundary layer formed near the wing surface 2 and the mainstream. Therefore, a strong flow of the mainstream can be applied to a weak flow of the boundary layer, and the kinetic energy of the boundary layer is increased. Accordingly, the peeling of the flow F in the fluid apparatus 100 can be further suppressed.

In addition, a decrease in action efficiency of the fluid apparatus 100 and a noise can be suppressed by suppressing the peeling of the flow F.

Namely, the essence of the structures 4 according to the present embodiment is that the inclined faces 52 and 62 with respect to the direction parallel to the flow F are present and there is a difference between the areas S1 and S2 of the faces 53 and 63 with which the fluid flowing in the inter-structure flow channel 14 comes into contact.

In addition, in the present embodiment, the first cross section 7 of the structure 4 obtained by being cut by a flat face that is parallel to the flow F and perpendicularly intersects with the wing surface 2 has the side 9 whose inclined angle α with respect to the wing surface 2 is 10 degrees or larger and 45 degrees or smaller, preferably, 20 degrees or larger and 30 degrees or smaller. According to the configuration, the generated vortex can be effectively carried to the mainstream direction by the upward flow 15.

In addition, in the present embodiment, the second cross section 11 obtained by cutting the structure 4 while passing through the tops 51 and 61 of the structure 4 by a flat face perpendicular to the flow F of the fluid includes at least two kinds of polygons that are different from each other. Accordingly, a shape in which the area S1 of the face 53 on the one structure 5 side with which the fluid flowing in the inter-structure flow channel 14 comes into contact is different from the area S2 of the face 63 on the other structure 6 side can be concretely configured.

In addition, in the present embodiment, the structure has a pyramidal shape. In addition, the first cross section 7 includes the triangle having the base 10, and the second cross section 11 includes the triangles 12 and 13 having different heights as at least two kinds of triangles that are different from each other. According to the configuration, the shape of the structure 4 can be more simplified.

In addition, in the present embodiment, the second cross section 11 includes the triangles 12 and 13 that are different from each other and have a height ratio of 0.1 or larger and 0.6 or smaller, preferably, 0.1 or larger and 0.3 or smaller. According to the configuration, a vortex can be more effectively generated in the boundary layer near the wing surface 2.

It should be noted that the structure 4 shown in FIG. 3 has a pyramidal shape having a quadrangular bottom face. However, the shape of the bottom face is not limited to a quadrangle, but may be another shape such as a circle (structure having a conical shape) or other polygon.

Further, in the present embodiment, the riblets 3 and 3*a* shown in FIG. 5 are formed on the wing surface 2. Accordingly, the frictional resistance of the flow F in the wing surface 2 is reduced. Nonpatent Literature 1 describes that the widths Wr and the heights Hr of the groove cross sections 32 and 32*a* of the riblets 3 and 3*a* by which the frictional resistance of the flow F can be reduced the most are determined on the basis of a Reynolds number. It is preferable to determine the widths Wr and the heights Hr of the groove cross sections 32 and 32*a* by referring to Nonpatent Literature 1.

Thus, according to the present embodiment, the frictional resistance of the flow F can be reduced while suppressing the peeling of the flow F in the fluid apparatus 100.

It should be noted that all the shapes of the riblets 3 and 3*a* are the same as those of the first embodiment in the following embodiments, and thus the explanation thereof will be omitted.

Second Embodiment

Next, a second embodiment of the present invention will be described while focusing on points different from the above-described first embodiment by referring to FIG. 7 to FIG. 8, and explanation of common points will be omitted.

Figure 7:
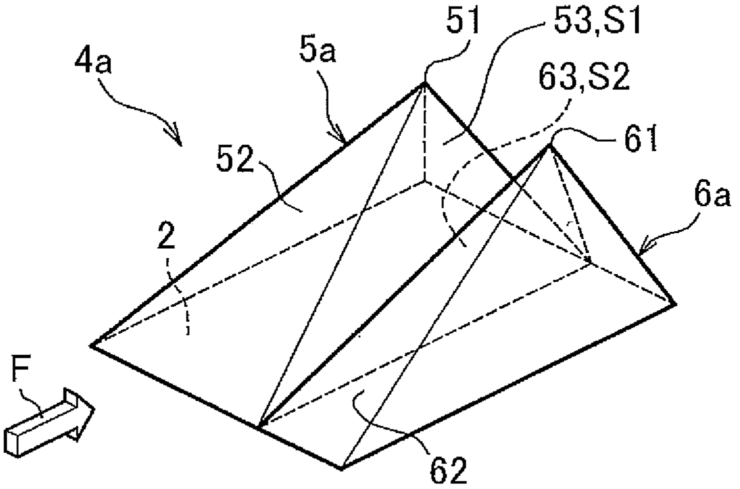
FIG. 7 is a perspective view for showing a structure provided on a wing surface in a fluid apparatus according to a second embodiment.

FIG. 7 is a perspective view for showing a structure 4*a* provided on a wing surface 2 in a fluid apparatus 100 according to the second embodiment. As shown in FIG. 7, a plurality of structures 4*a* includes structures 5*a* and 6*a* having at least two kinds of shapes that are different from each other such as the pyramidal shapes that are shown.

FIG. 8(*a*) is a diagram for showing a first cross section 7 obtained by cutting the structure 4*a* while passing through tops 51 and 61 that are apexes of the structure 4*a* by a flat face that is parallel to a flow F of a fluid and perpendicularly intersects with the wing surface 2. FIG. 8(*b*) is a diagram for showing a second cross section 11*a* obtained by cutting the structure 4*a* while passing through the tops 51 and 61 of the structure 4*a* by a flat face perpendicular to the flow F of the fluid. As shown in FIG. 8(*b*), the second cross section 11*a* includes triangles 12*a* and 13*a* whose lengths W1 and W2 of bases 21 and 22 are different from each other as at least two kinds of polygons that are different from each other.

Even in such a structure 4*a* according to the second embodiment, inclined faces 52 and 62 with respect to the direction parallel to the flow F are present, and there is a difference between the areas S1 and S2 of faces 53 and 63 with which the fluid flowing in an inter-structure flow channel 14 comes into contact. Thus, it is possible to further suppress the peeling of the flow F in the fluid apparatus 100 also according to the second embodiment.

In addition, in the second embodiment, the second cross section 11*a* shown in FIG. 8(*b*) includes the triangles 12*a* and 13*a* that are different from each other and have the bases 21 and 22 having a length ratio (W2/W1) of 0.1 or larger and 0.6 or smaller, preferably, 0.1 or larger and 0.3 or smaller. Accordingly, a vortex can be more effectively generated in a boundary layer near the wing surface 2, and as a result, it is possible to prevent the peeling of the flow F from the wing surface 2.

Third Embodiment

Next, a third embodiment of the present invention will be described while focusing on points different from the above-described first embodiment by referring to FIG. 9 to FIG. 10, and explanation of common points will be omitted.

Figure 9:
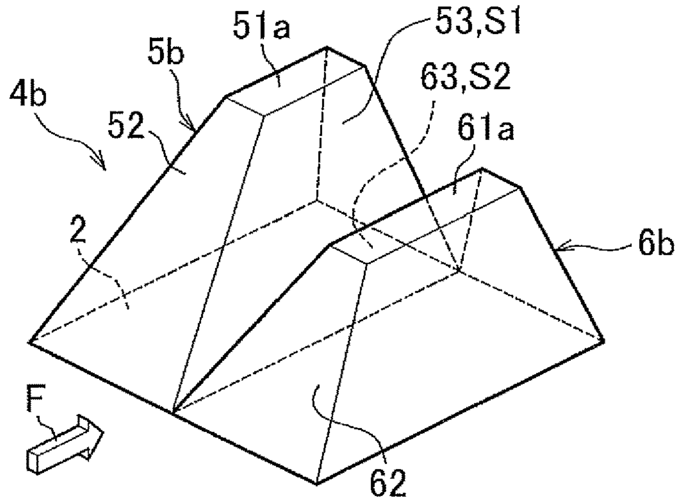
FIG. 9 is a perspective view for showing a structure provided on a wing surface in a fluid apparatus according to a third embodiment.

FIG. 9 is a perspective view for showing a structure 4*b* provided on a wing surface 2 in a fluid apparatus 100 according to the third embodiment. As shown in FIG. 9, a plurality of structures 4*b* includes structures 5*b* and 6*b* having at least two kinds of frustum shapes that are different from each other.

FIG. 10(*a*) is a diagram for showing a first cross section 7*a* obtained by cutting the structure 4*b* while passing through tops 51*a* and 61*a* that are upper bottom faces of the structure 4*b* by a flat face that is parallel to a flow F of a fluid and perpendicularly intersects with the wing surface 2. As shown in FIG. 10(*a*), the first cross section 7*a* includes a quadrangle having a side 9*a* that extends from a point 8*a* on the wing surface 2 to the tops 51*a* and 61*a* apart from the wing surface 2 on the downstream side of the flow F of the fluid, and a base 10*a* positioned on the wing surface 2. The side 9*a* and the base 10*a* share the point 8*a* on the upstream side of the flow F. An angle α formed by the base 10*a* and the side 9*a* configures an inclined angle of the side 9*a* with respect to the wing surface 2. In the first cross section 7*a*, the inclined angle α of the side 9*a* with respect to the wing surface 2 is 10 degrees or larger and 45 degrees or smaller, preferably, 20 degrees or larger and 30 degrees or smaller. Accordingly, the generated vortex can be more effectively carried to the mainstream direction.

FIG. 10(*b*) is a diagram for showing a second cross section lib obtained by cutting the structure 4*b* while passing through the tops 51*a* and 61*a* of the structure 4*b* by a flat face perpendicular to the flow F of the fluid. As shown in FIG. 10(*b*), the second cross section lib includes quadrangles 12*b* and 13*b* whose heights H1 and H2 are different from each other as at least two kinds of polygons that are different from each other.

Even in such a structure 4*b* according to the third embodiment, inclined faces 52 and 62 with respect to the direction parallel to the flow F are present, and there is a difference between the areas S1 and S2 of faces 53 and 63 with which the fluid flowing in an inter-structure flow channel 14 comes into contact. Thus, it is possible to further suppress the peeling of the flow F in the fluid apparatus 100 also according to the third embodiment.

In addition, in the third embodiment, the second cross section 11*b* shown in FIG. 10(*b*) includes the quadrangles 12*b* and 13*b* that are different from each other and have a height ratio (H2/H1) of 0.1 or larger and 0.6 or smaller, preferably, 0.1 or larger and 0.3 or smaller. Accordingly, a vortex can be more effectively generated in a boundary layer near the wing surface 2.

It should be noted that the structure 4*b* shown in FIG. 9 has a shape having a quadrangular upper face and a quadrangular lower bottom face. However, the shapes of the upper bottom face and the lower bottom face are not limited to a quadrangle, but may be another shape such as a circle or other polygon.

Fourth Embodiment

Next, a fourth embodiment of the present invention will be described while focusing on points different from the above-described third embodiment by referring to FIG. 11 to FIG. 12, and explanation of common points will be omitted.

Figure 11:
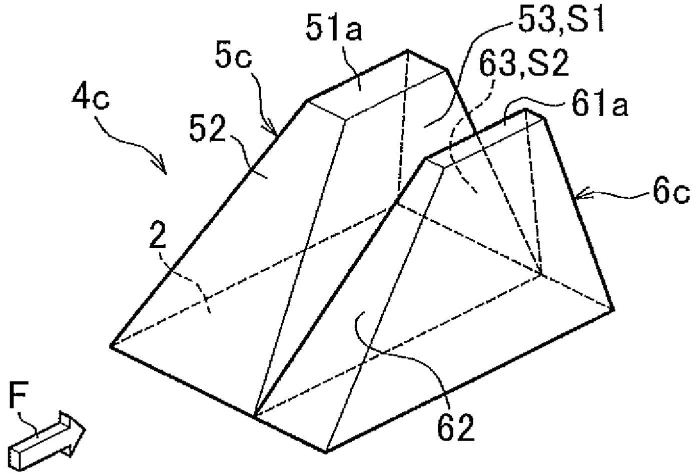
FIG. 11 is a perspective view for showing a structure provided on a wing surface in a fluid apparatus according to a fourth embodiment.

FIG. 11 is a perspective view for showing a structure 4*c* provided on a wing surface 2 in a fluid apparatus 100 according to the fourth embodiment. As shown in FIG. 11, a plurality of structures 4*c* includes structures 5*c* and 6*c* having at least two kinds of frustum shapes that are different from each other.

FIG. 12(*a*) is a diagram for showing a first cross section 7*a* obtained by cutting the structure 4*c* while passing through tops 51*a* and 61*a* that are upper bottom faces of the structure 4*c* by a flat face that is parallel to a flow F of a fluid and perpendicularly intersects with the wing surface 2. FIG. 12(*b*) is a diagram for showing a second cross section 11*c* obtained by cutting the structure 4*c* while passing through the tops 51*a* and 61*a* of the structure 4*c* by a flat face perpendicular to the flow F of the fluid. As shown in FIG. 12(*b*), the second cross section 11*c* includes quadrangles 12*c* and 13*c* whose lengths W1 and W2 of bases 21*a* and 22*a* are different from each other as at least two kinds of polygons that are different from each other.

Even in such a structure 4*c* according to the fourth embodiment, inclined faces 52 and 62 with respect to the direction parallel to the flow F are present, and there is a difference between the areas S1 and S2 of faces 53 and 63 with which the fluid flowing in an inter-structure flow channel 14 comes into contact. Thus, it is possible to further suppress the peeling of the flow F in the fluid apparatus 100 also according to the fourth embodiment.

In addition, in the fourth embodiment, the second cross section 11*c* shown in FIG. 12(*b*) includes the quadrangles 12*c* and 13*c* that are different from each other and have the bases 21*a* and 22*a* having a length ratio (W2/W1) of 0.1 or larger and 0.6 or smaller, preferably, 0.1 or larger and 0.3 or smaller. Accordingly, a vortex can be more effectively generated in a boundary layer near the wing surface 2.

Fifth Embodiment

Next, a fifth embodiment of the present invention will be described while focusing on points different from the above-described first embodiment by referring to FIG. 13 to FIG. 14, and explanation of common points will be omitted.

Figure 13:
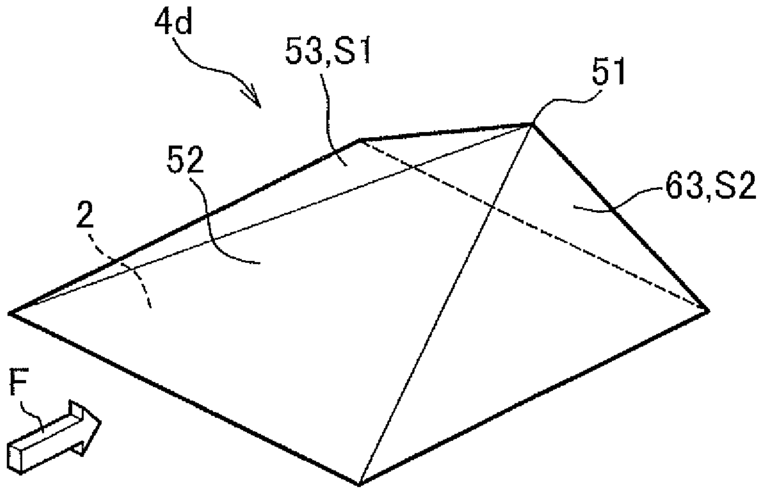
FIG. 13 is a perspective view for showing a structure provided on a wing surface in a fluid apparatus according to a fifth embodiment.

FIG. 13 is a perspective view for showing a structure 4*d* provided on a wing surface 2 in a fluid apparatus 100 according to the fifth embodiment. As shown in FIG. 13, the structure 4*d* is formed in a pyramidal shape.

FIG. 14(*a*) is a diagram for showing a first cross section 7 obtained by cutting the structure 4*d* while passing through a top 51 that is an apex of the structure 4*d* by a flat face that is parallel to a flow F of a fluid and perpendicularly intersects with the wing surface 2. FIG. 14(*b*) is a diagram for showing a second cross section 11*d* obtained by cutting the structure 4*d* while passing through the top 51 of the structure 4*d* by a flat face perpendicular to the flow F of the fluid. As shown in FIG. 14(*b*), the second cross section 11*d* includes a polygon that is asymmetrical on the left and right sides viewed from the upstream side of the flow F. Specifically, the second cross section 11*d* includes a triangle whose lengths L1 and L2 of two oblique sides 23 and 24 extending from the both end points of a base 21*b* are different from each other.

Even in such a structure 4*d* according to the fifth embodiment, an inclined face 52 with respect to the direction parallel to the flow F is present, and there is a difference between the areas S1 and S2 of faces 53 and 63 with which the fluid flowing in an inter-structure flow channel 14 comes into contact. Thus, it is possible to further suppress the peeling of the flow F in the fluid apparatus 100 also according to the fifth embodiment.

In addition, in the fifth embodiment, the second cross section 11*d* shown in FIG. 14(*b*) includes the triangles that are different from each other and have the two oblique sides 23 and 24 having a ratio (L2/LL) of the lengths L1 and L2 of 0.1 or larger and 0.6 or smaller, preferably, 0.1 or larger and 0.3 or smaller. Accordingly, a vortex can be more effectively generated in a boundary layer near the wing surface 2.

Sixth Embodiment

Next, a sixth embodiment of the present invention will be described while focusing on points different from the above-described third embodiment by referring to FIG. 15 to FIG. 16, and explanation of common points will be omitted.

Figure 15:
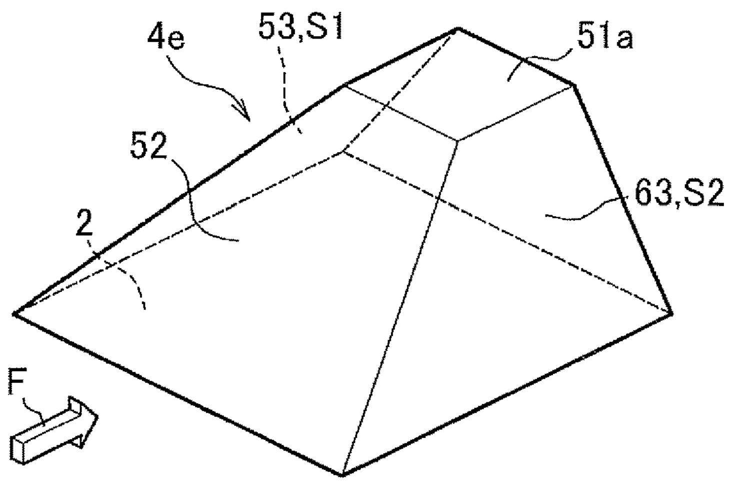
FIG. 15 is a perspective view for showing a structure provided on a wing surface in a fluid apparatus according to a sixth embodiment.

FIG. 15 is a perspective view for showing a structure 4*e* provided on a wing surface 2 in a fluid apparatus 100 according to the sixth embodiment. As shown in FIG. 15, the structure 4*e* is formed in a frustum shape.

FIG. 16(*a*) is a diagram for showing a first cross section 7*a* obtained by cutting the structure 4*e* while passing through a top 51*a* that is an upper bottom face of the structure 4*e* by a flat face that is parallel to a flow F of a fluid and perpendicularly intersects with the wing surface 2. FIG. 16(*b*) is a diagram for showing a second cross section 11*e* obtained by cutting the structure 4*e* while passing through the top 51*a* of the structure 4*e* by a flat face perpendicular to the flow F of the fluid. As shown in FIG. 16(*b*), the second cross section 11*e* includes a polygon that is asymmetrical on the left and right sides viewed from the upstream side of the flow F. Specifically, the second cross section 11*e* includes a quadrangle whose lengths L1 and L2 of two opposite sides 23*a* and 24*a* extending from the both end points of a base 21*c* are different from each other.

Even in such a structure 4*e* according to the sixth embodiment, an inclined face 52 with respect to the direction parallel to the flow F is present, and there is a difference between the areas S1 and S2 of faces 53 and 63 with which the fluid flowing in an inter-structure flow channel 14 comes into contact. Thus, it is possible to further suppress the peeling of the flow F in the fluid apparatus 100 also according to the sixth embodiment.

In addition, in the sixth embodiment, the second cross section 11*e* shown in FIG. 16(*b*) includes the quadrangles that are different from each other and have the two opposite sides 23*a* and 24*a* having a ratio (L2/LL) of the lengths L1 and L2 of 0.1 or larger and 0.6 or smaller, preferably, 0.1 or larger and 0.3 or smaller. Accordingly, a vortex can be more effectively generated in a boundary layer near the wing surface 2.

(Analysis of Flow)

Hereinafter, an effect that can suppress the peeling of the flow F in the fluid apparatus 100 will be described on the basis of a fluid analysis result. However, the following analysis result is used for explaining an effect of the present invention, and the technical scope of the present invention is not limited to the following analysis result.

Figure 17:
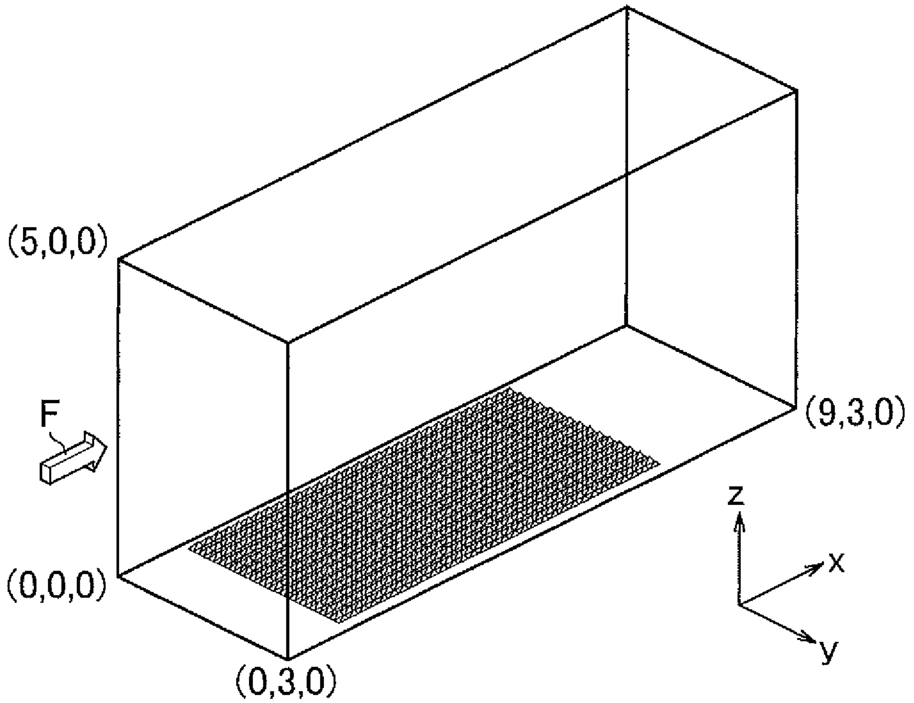
FIG. 17 is a perspective view for showing an entire configuration of an analysis model used in a numerical fluid analysis.

FIG. 17 is a perspective view for showing an entire configuration of an analysis model used in a numerical fluid analysis.

As shown in FIG. 17, an analysis region is a rectangular solid with 9 mm in the x direction, 3 mm in the y direction, and 5 mm in the z direction. Structure models were arranged on the bottom face of the rectangular solid. In addition, the state of the flow F when the air flowed into a flow channel represented by the rectangular solid in the x direction was analyzed by the numerical fluid analysis to study a generation mechanism of an upward flow and a generation mechanism of a vortex necessary for suppressing the peeling of the flow F.

First, a generation effect of the upward flow was analyzed.

Figure 18:
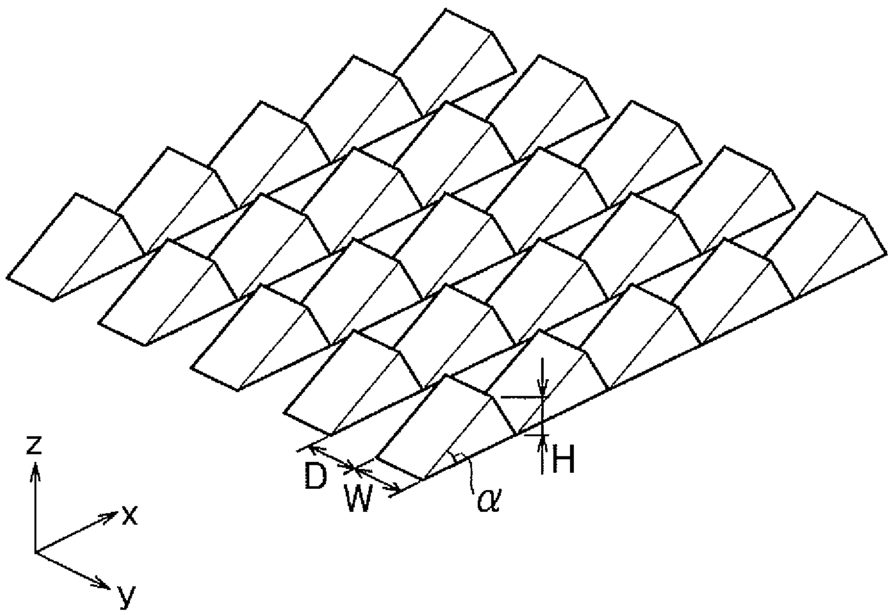
FIG. 18 is an enlarged perspective view for showing structure models used to analyze a generation effect of an upward flow.

FIG. 18 is an enlarged perspective view for showing the structure models used to analyze the generation effect of the upward flow. Each of the structure models is a wedge-type structure with a height H of 0.1 mm, a width W of 0.05 mm, and an inclined angle α. The arrangement intervals D of the structure models in the y direction were 0.05 mm. The analysis was conducted by changing the inclined angle α. In addition, the analysis was conducted under the conditions of flow velocities of 50 m/s and 100 m/s.

Figure 19:
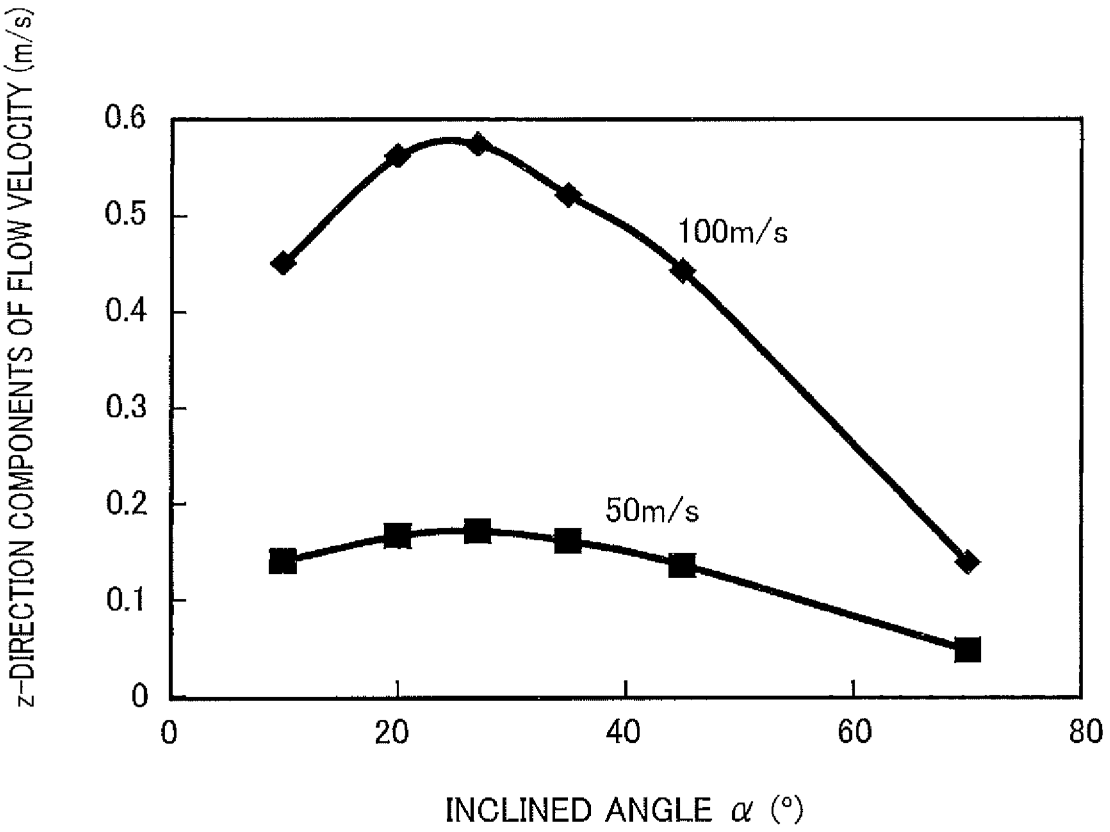
FIG. 19 is a graph shown by plotting a relation between an inclined angle and an average value of z-direction components of a flow velocity in an analysis region.

FIG. 19 is a graph shown by plotting a relation between the inclined angle α and an average value of z-direction components of the flow velocity in the analysis region. In FIG. 19, the graph shown on the upper side shows an analysis result in the case of a flow velocity of 100 m/s, and the graph shown on the lower side shows an analysis result in the case of a flow velocity of 50 m/s.

As shown in FIG. 19, it was found that the z-direction components of the flow velocity were maximized and the generation effect of the upward flow was the highest at an inclined angle α of 25 degrees in both cases of flow velocities of 50 m/s and 100 m/s. In addition, in order to enhance an effect of suppressing the peeling of the flow F, it was found that the inclined angle α was desirably 10 degrees or larger and 45 degrees or smaller, more desirably 20 degrees or larger and 30 degrees or smaller.

Next, a generation effect of the vortex was analyzed using two structure models.

FIG. 20(*a*) is an enlarged perspective view for showing the first structure model to analyze the generation effect of the vortex. FIG. 20(*b*) is a diagram for showing a cross section obtained by cutting the structure model while passing through the top of the structure model by a flat face perpendicular to the flow F. The structure model shown in FIG. 20 corresponds to the first embodiment shown in FIG. 3 to FIG. 4.

As shown in FIG. 20(*a*), an inclined angle α of 27 degrees at which the generation effect of the upward flow became apparent in the analysis was employed in the structure model. In a cross section shown in FIG. 20(*b*), triangles each having a height H1 and a base length W1 and triangles each having a height H2 and a base length W2 were alternately arranged. In the analysis, the analysis was conducted while changing the value of H2 under the conditions of H1=0.1 mm, W1=0.2 mm, and W2=0.2 mm. In addition, the analysis was conducted under the conditions of flow velocities of 50 m/s and 100 m/s.

Figure 21A:
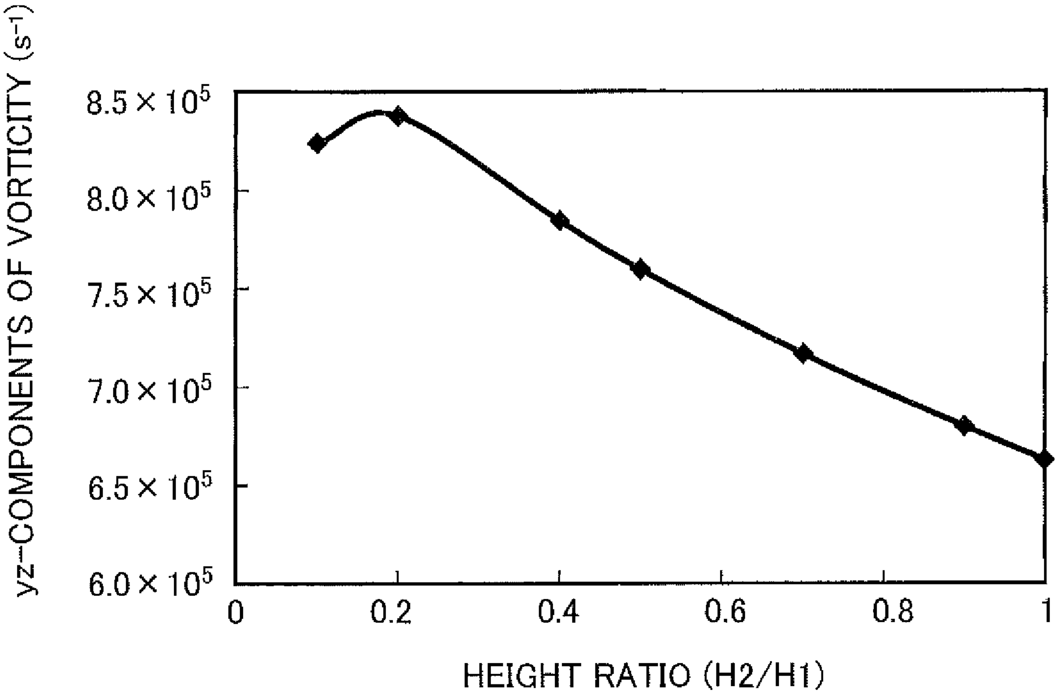
FIG. 21 are graphs shown by plotting a relation between the height ratio of triangles and an average value of yz components of a vorticity in the analysis region, FIG. 21(*a*) shows an analysis result in the case of a flow velocity of 50 m/s, and FIG. 21(*b*) shows an analysis result in the case of a flow velocity of 100 m/s.
Figure 21B:
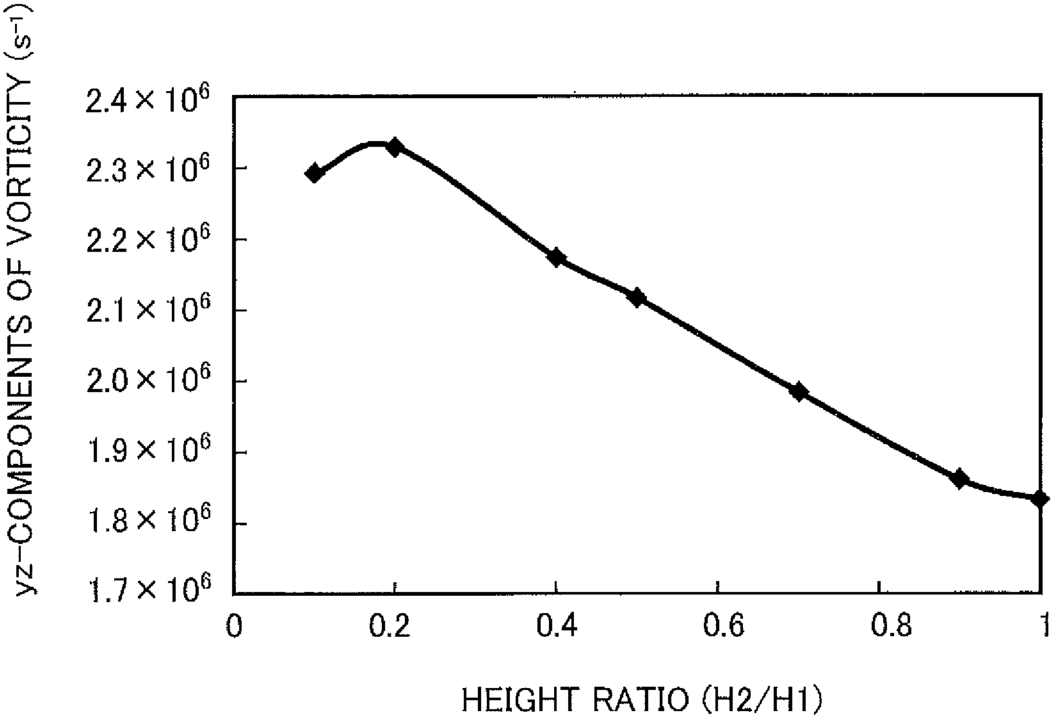

FIG. 21 are graphs shown by plotting a relation between the height ratio (H2/H1) of the triangles and an average value of yz components $\omega_{yz}$ of a vorticity ω (vector amount) in the analysis region. FIG. 21(*a*) shows an analysis result in the case of a flow velocity of 50 m/s, and FIG. 21 (*b*) shows an analysis result in the case of a flow velocity of 100 m/s.

Here, $\omega_{yz}$ is an index indicating the strength of the vortex having an axis in the direction parallel to the flow F, and is expressed by the following equations (2) and (3). U in the equation (2) represents the velocity (vector amount) of the fluid.

[Formula 2]

$$\omega = \mathrm{rot}\, U \tag{2}$$

$$\omega_{yz} = \sqrt{\omega_y^2 + \omega_z^2} \tag{2}$$

As shown in FIG. 21, it was found that $\omega_{yz}$ was minimized when the heights of the triangles were equal to each other (H2/H1=1.0) and the generation effect of the vortex became higher when the heights of the triangles were different from each other in both cases of flow velocities of 50 m/s and 100 m/s. In addition, in order to enhance an effect of preventing the peeling of the flow F, it was found that the height ratio (H2/H1) of the triangles was desirably 0.1 or larger and 0.6 or smaller, more desirably 0.1 or larger and 0.3 or smaller.

FIG. 22(*a*) is an enlarged perspective view for showing the second structure model to analyze the generation effect of the vortex. FIG. 22(*b*) is a diagram for showing a cross section obtained by cutting the structure model while passing through the top of the structure model by a flat face perpendicular to the flow F. The structure model shown in FIG. 22 corresponds to the second embodiment shown in FIG. 7 to FIG. 8.

As shown in FIG. 22(*a*), an inclined angle α of 27 degrees at which the generation effect of the upward flow became apparent in the analysis was employed in the structure model. In a cross section shown in FIG. 22(*b*), triangles each having a height H1 and a base length W1 and triangles each having a height H2 and a base length W2 were alternately arranged. In the analysis, the analysis was conducted while changing the value of W2 under the conditions of H1=0.1 mm, W1=0.2 mm, and H2=0.1 mm. In addition, the analysis was conducted under the conditions of flow velocities of 50 m/s and 100 m/s.

Figure 23A:
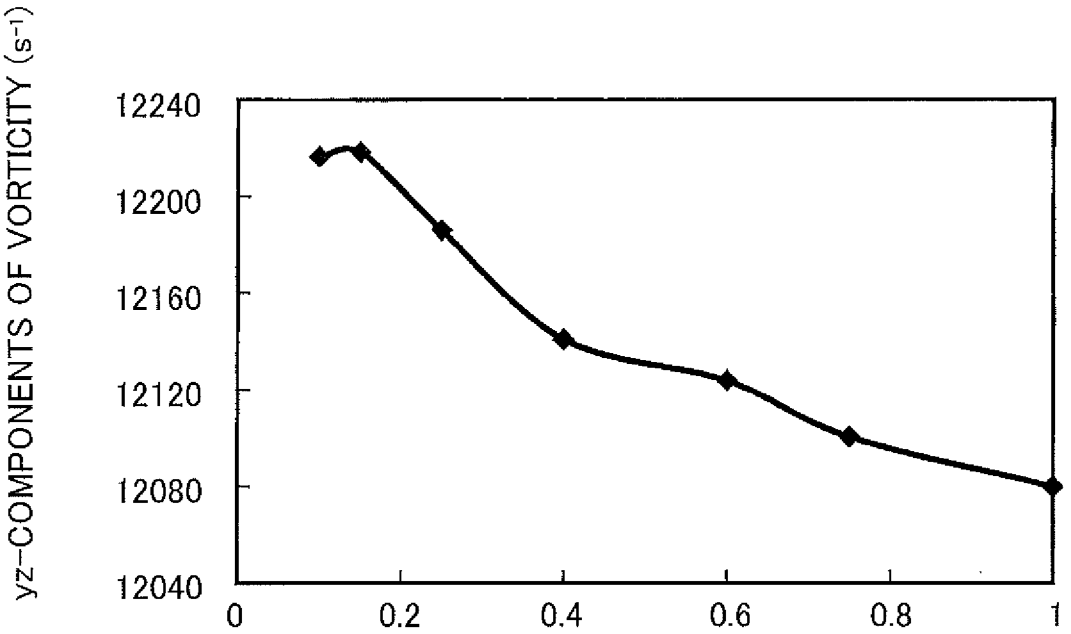
FIG. 23 are graphs shown by plotting a relation between the base length ratio of triangles and an average value of yz components of a vorticity in the analysis region, FIG. 23(*a*) shows an analysis result in the case of a flow velocity of 50 m/s, and FIG. 23(*b*) shows an analysis result in the case of a flow velocity of 100 m/s.
Figure 23B:
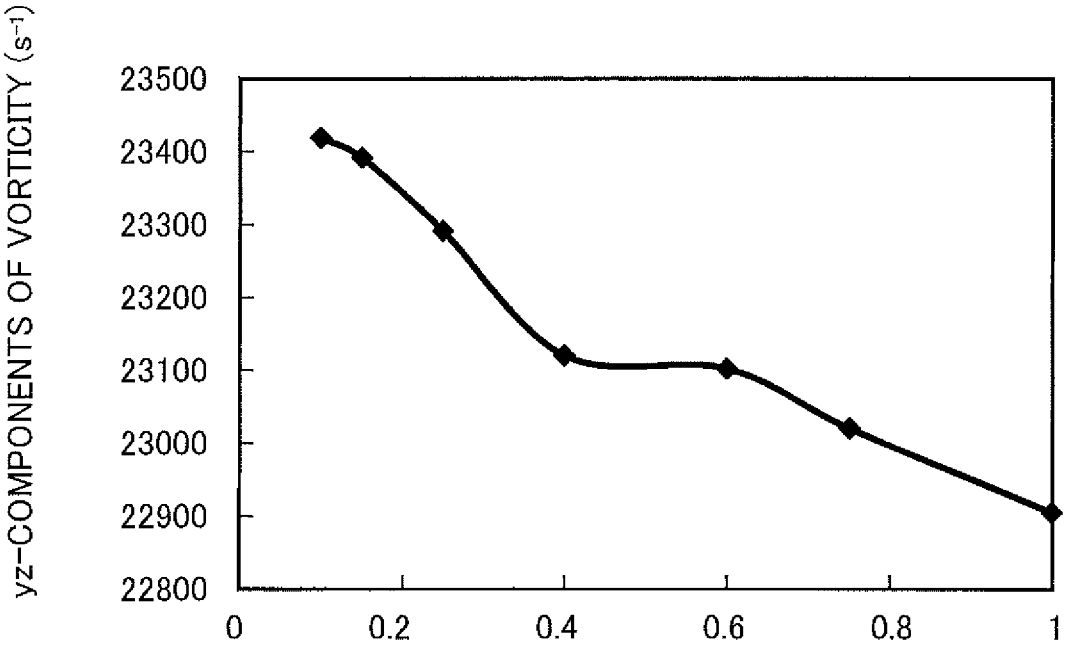

FIG. 23 are graphs shown by plotting a relation between the base length ratio (W2/W1) of the triangles and an average value of yz components c of a vorticity co in the analysis region. FIG. 23(*a*) shows an analysis result in the case of a flow velocity of 50 m/s, and FIG. 23(*b*) shows an analysis result in the case of a flow velocity of 100 m/s.

As shown in FIG. 23, it was found that $\omega_{yz}$ was minimized when the base lengths of the triangles were equal to each other (W2/W1=1.0) and the generation effect of the vortex became higher when the base lengths of the triangles were different from each other in both cases of flow velocities of 50 m/s and 100 m/s. In addition, in order to enhance an effect of preventing the peeling of the flow F, it was found that the base length ratio (W2/W1) of the triangles was desirably 0.1 or larger and 0.6 or smaller, more desirably 0.1 or larger and 0.3 or smaller.

In the analysis, the analysis was conducted using specific dimensions, shapes, and conditions. However, the essence of the present invention is that the inclined faces with respect to the direction parallel to the flow F are present and there is a difference between the areas of parts (faces) with which the fluid flowing in the inter-structure flow channel comes into contact as described above. Thus, even in the case where the dimensions, number, and intervals of structures to be installed, or the flow velocity of the liquid or gas is changed, it is possible to obtain an effect of suppressing the peeling of the flow F.

For example, the number of structures 4 and 4*a* to 4*e* shown in the above-described first to sixth embodiments formed on the wing surface 2 is not limited. In addition, the above-described analysis was conducted in two cases where the flow velocities were 50 m/s and 100 m/s, and analysis results were obtained with different Reynolds numbers. As a result, the present invention was effective in enhancing an effect of suppressing the peeling of the flow F in any analysis result. Thus, it is considered to be effective in suppressing the peeling of the flow F even in the case of another flow velocity.

(Measurement of Pressure)

Hereinafter, an improvement effect of a surge margin (to be described below) and a reducing effect of the frictional resistance of the flow F in the fluid apparatus 100 will be described on the basis of a pressure measurement experiment. However, the following experiment result is used for explaining an effect of the present invention, and the technical scope of the present invention is not limited to the following experiment result.

First, the pressure measurement experiment in the flow channel 1 of the diffuser 102 was conducted using the wings 101 of the diffuser 102 shown in FIG. 1 without the structures and the riblets characterized in the present invention and the wings 101 with the structures corresponding to the second embodiment shown in FIG. 7 to FIG. 8. The shapes of the structures used in the experiment were the same as FIG. 22, and correspond to the second embodiment of the present invention. The experiment was conducted under the conditions of H1=0.1 mm, W1=0.2 mm, H2=0.1 mm, W2=0.1 mm, and α=27 degrees. However, no riblets were provided.

In the experiment, an impeller was provided on the inner side of the diffuser 102 in the radial direction, and the impeller was rotated at 45000 rpm.

Figure 24A:
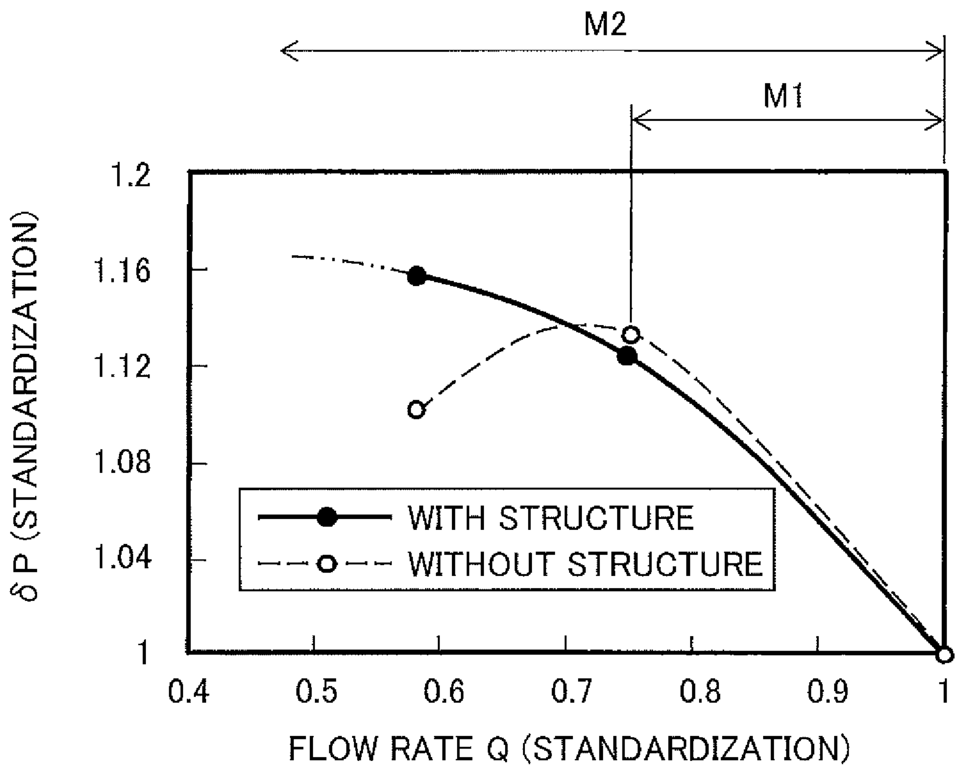
FIG. 24 are graphs shown by plotting a relation between a flow rate and a pressure difference, FIG. 24(*a*) shows an experiment result in the range of a flow rate Q from 0 to 1, and FIG. 24(*b*) shows an experiment result in the range of the flow rate Q from 0 to 2.
Figure 24B:
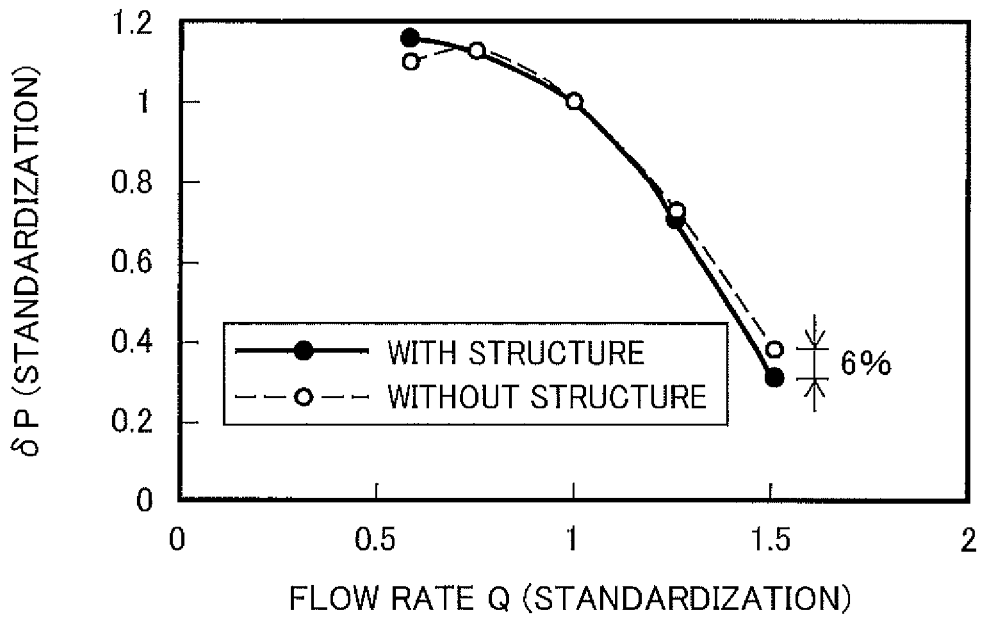

FIG. 24 are graphs of the pressure measurement results. The horizontal axis represents a flow rate Q, and the vertical axis represents a pressure difference δP (=PB−PA) that is a difference between the pressure (PA) of a measurement point A positioned on the upstream side of the flow F shown in FIG. 1 and the pressure (PB) of a measurement point B positioned on the downstream side of the flow F. Both of the vertical axis and the horizontal axis are standardized and displayed with the value at the design point as 1. FIG. 24(*a*) is a graph showing the range of the flow rate Q from 0.4 to 1.0, and FIG. 24(*b*) is a graph showing the range of the flow rate Q from 0 to 2.0.

As shown in FIG. 24(*a*), δP is maximized at Q=0.75 and δP is decreased towards Q=0.58 in the case of the diffuser without the structures of the present invention on the wing surface that is the surface of the wing 101. Namely, the velocity is reduced on the low flow rate side. On the other hand, δP is not decreased at Q=0.58 and the velocity is not reduced in the case of the diffuser with the structures of the present invention on the wing surface. The range of the flow rate from Q=1 that is the design point to the point where δP is maximized is the range where the apparatus is stably operated, and the range is referred to as a surge margin. In FIG. 24(*a*), M1 represents a surge margin in the case of having no structures, and M2 represents a surge margin in the case of having the structures. It was found that the peeling was suppressed and the surge margin was advantageously improved by providing the structures of the present invention on the wing surface.

In addition, it can be understood from FIG. 24(*b*) that the value of δP is generally small in the case of the diffuser with the structures of the present invention on the wing surface as compared to the diffuser without the structures of the present invention on the wing surface. In particular, the value of δP of the diffuser with the structures of the present invention on the wing surface is smaller by 6% at Q=1.5 where the flow rate is high as compared to the diffuser without the structures of the present invention on the wing surface 2. This means that the frictional resistance of the flow F was increased and the pressure increase rate in the diffuser was reduced by providing the structures on the wing surface.

Next, a similar pressure measurement experiment was conducted in the diffuser in which the riblets in addition to the structures used in the above-described experiment were provided on the wing surface. The cross-sectional shapes of the riblets are the same as FIG. 5(*a*), Wr is 0.056 mm, and Hr is 0.056 mm.

Figure 25:
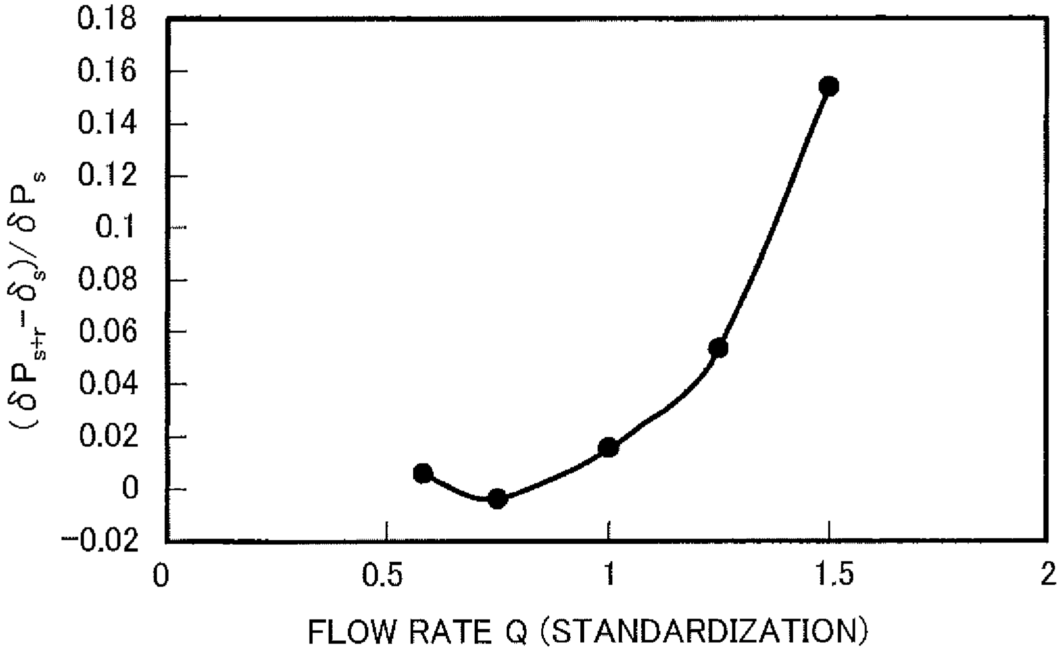
FIG. 25 is a graph shown by plotting a relation between a flow rate and a ratio of an increase in pressure difference in the case of providing the structures and the riblets on the wing surface to the pressure difference in the case of providing only the structures on the wing surface.

FIG. 25 is a graph of the pressure measurement results. The horizontal axis represents a flow rate Q, and the vertical axis represents a ratio $((\delta P_{s+r}-\delta P_s)/\delta P_s)$ of an increase in pressure difference δP ($\delta P_{s+r}$) in the case of having the structures and the riblets on the wing surface to the pressure difference δP ($\delta P_s$) in the case of having only the structures on the wing surface.

As shown in FIG. 25, the value of δP of the diffuser with the structures and the riblets of the present invention is large, and is particularly larger by 15% or more at Q=1.5 as compared to the diffuser with only the structures of the present invention on the wing surface. This means that the frictional resistance of the flow F was decreased and the pressure increase rate in the diffuser was increased by providing the riblets on the wing surface.

The present invention has been described above on the basis of the embodiments. However, the present invention is not limited to the above-described embodiments, and includes various modified examples. For example, the above-described embodiments have been described in detail to easily understand the present invention, and are not necessarily limited to those including all the configurations described above. Other configurations of the above-described embodiments can be added to, deleted from, or replaced by a part of the configurations of the embodiments.

For example, the centrifugal compressor has been described as a fluid apparatus in the above-described embodiments, but the present invention is not limited to this. The present invention can be generally applied to a fluid apparatus using a fluid such as a centrifugal compressor, a vacuum cleaner, or an air conditioner.

In addition, a case in which the structures and the riblets are provided on the wing surface of the diffuser has been described in the above-described embodiments, but the present invention is not limited to this. The structures and the riblets may be provided on a wing surface on which a fluid flows in other various members such as, for example, an impeller.

LIST OF REFERENCE SIGNS

1 flow channel
2 wing surface
3, 3*a* riblet
4, 4*a* to 4*e* structure
5, 5*a* to 5*c* structure
6, 6*a* to 6*c* structure
7, 7*a* first cross section
8, 8*a* point
9, 9*a* side
10, 10*a* base
11, 11*a* to 11*e* second cross section
12, 13, 12*a*, 13*a* triangle
12*b*, 13*b*, 12*c*, 13*c* quadrangle
14 inter-structure flow channel
15 upward flow
16 rotating flow field
21, 22, 21*a*, 22*a*, 21*b*, 21*c* base
23, 24 oblique side
23*a*, 24*a* opposite side
31, 31*a* third cross section
32 triangular groove cross section
32*a* quadrangular groove cross section
51, 61 apex (top)
51*a*, 61*a* upper bottom face (top)
52, 62 inclined face
53, 63 face (part)
100 fluid apparatus
101 wing
102 diffuser
S1, S2 area
α inclined angle

The invention claimed is:

1. A fluid apparatus comprising:

a plurality of wings between which a fluid flows;

a plurality of structures that are provided on a wing surface that is a surface of each said wing and are formed in a shape protruding from the wing surface, and a plurality of riblets that are provided on the wing surface and that are formed in a shape depressed from the wing surface, wherein a first cross section obtained by cutting the structure while passing through a top of the structure by a flat face that is parallel to the flow of the fluid and perpendicularly intersecting with the wing surface, the first cross section having a side that extends from a first point on the wing surface to a second point spaced apart from the wing surface and downstream with respect to the flow of the fluid from the first point, and an inter-structure flow channel that is formed between two adjacent said structures among the plurality of structures, wherein a first area of the first cross section of one of the two adjacent structures and a second area of the first cross section of the other of the two adjacent structures, between which the fluid flows in the inter-structure flow channel, are different from each other, and wherein a second cross section obtained by cutting the structure while passing through the top of the structure by the flat face perpendicular to the flow of the fluid is an asymmetric polygon.

2. The fluid apparatus according to claim 1, wherein in the first cross section, an inclined angle of the side with respect to the wing surface is 10 degrees or larger and 45 degrees or smaller.

3. The fluid apparatus according to claim 1, wherein each said polygon of the two adjacent structures has the same number of sides and are different in size from each other.

4. The fluid apparatus according to claim 3, wherein the structure is formed in a shape of a pyramid, the first cross section includes a triangle having a base that shares the first point at one end and extends downstream to a third point at an other end that is on the wing surface, an inclined angle of the side with respect to the wing surface is an angle formed by the base and the side, and the second cross section of each of the two adjacent structures includes two triangles that are different in size from each other.

5. The fluid apparatus according to claim 4, wherein in the second cross section, the respective two triangles have a height ratio of 0.1 or larger and 0.6 or smaller.

6. The fluid apparatus according to claim 4, wherein in the second cross section the respective two triangles have a base length ratio of 0.1 or larger and 0.6 or smaller.

7. The fluid apparatus according to claim 3, wherein the structure is formed in a frustum shape, the first cross section includes a quadrangle having a base that shares the first point at one end and extends downstream to a third point at an other end that is on the wing surface, an inclined angle of the side with respect to the wing surface is an angle formed by the base and the side, and the second cross section of each of the two adjacent structures includes two quadrangles that are different in size from each other.

8. The fluid apparatus according to claim 7, wherein in the second cross section the respective two quadrangles have a height ratio of 0.1 or larger and 0.6 or smaller.

9. The fluid apparatus according to claim 7, wherein in the second cross section the respective two quadrangles have a base length ratio of 0.1 or larger and 0.6 or smaller.

10. The fluid apparatus according to claim 1, wherein a third cross section obtained by cutting the riblet by a flat face perpendicular to the flow of the fluid has a triangular groove cross section.

11. The fluid apparatus according to claim 1, wherein the third cross section obtained by cutting the riblet by the flat face perpendicular to the flow of the fluid has a quadrangular groove cross section.

12. The fluid apparatus according to claim 1, wherein
the structure is formed in a shape of a pyramid,
the first cross section includes a triangle having a base that shares the first point at one end and extends downstream to a third point at an other end that is on the wing surface,
an inclined angle of the side with respect to the wing surface is an angle formed by the base and the side, and
the second cross section of each of the two adjacent structures includes a triangle whose lengths of two inclined sides extending from both end points of the base are different from each other.

13. The fluid apparatus according to claim 12, wherein the length ratio of the two inclined sides is 0.1 or larger and 0.6 or smaller.

14. The fluid apparatus according to claim 1, wherein
the structure is formed in a frustum shape,
the first cross section includes a quadrangle having a base that shares the first point at one end and extends downstream to a third point at an other end that is on the wing surface,
an inclined angle of the side with respect to the wing surface is an angle formed by the base and the side, and
the second cross section of each of the two adjacent structures includes a quadrangle whose lengths of two opposite sides extending from both end points of the base are different from each other.

15. The fluid apparatus according to claim 14, wherein the length ratio of the two opposite sides is 0.1 or larger and 0.6 or smaller.

* * * * *